United States Patent
Suzuki et al.

(10) Patent No.: US 12,002,359 B2
(45) Date of Patent: Jun. 4, 2024

(54) COMMUNICATION METHOD FOR VEHICLE DISPATCH SYSTEM, VEHICLE DISPATCH SYSTEM, AND COMMUNICATION DEVICE

(71) Applicant: Nissan Motor Co., Ltd., Kanagawa (JP)

(72) Inventors: Masayasu Suzuki, Kanagawa (JP); Masahide Nakamura, Kanagawa (JP); Masaki Watanabe, Kanagawa (JP); Daisuke Saito, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 143 days.

(21) Appl. No.: 17/255,775

(22) PCT Filed: Jun. 20, 2018

(86) PCT No.: PCT/IB2018/000945
§ 371 (c)(1),
(2) Date: May 5, 2021

(87) PCT Pub. No.: WO2019/243860
PCT Pub. Date: Dec. 26, 2019

(65) Prior Publication Data
US 2021/0264783 A1   Aug. 26, 2021

(51) Int. Cl.
*G08G 1/123*   (2006.01)
*G06V 40/16*   (2022.01)
(Continued)

(52) U.S. Cl.
CPC .......... *G08G 1/123* (2013.01); *G06V 40/166* (2022.01); *H04N 7/181* (2013.01); *H04N 23/698* (2023.01)

(58) Field of Classification Search
None
See application file for complete search history.

(56) References Cited

U.S. PATENT DOCUMENTS 9,494,938 B1   11/2016   Kemler et al.
2004/0111280 A1   6/2004   Ohtani
(Continued)

FOREIGN PATENT DOCUMENTS

CN   202929851 U   *   5/2013
GB   2424730 A   *   10/2006   ....... G06F 17/30241
(Continued)

*Primary Examiner* — Shadan E Haghani
(74) *Attorney, Agent, or Firm* — Osha Bergman Watanabe & Burton LLP

(57) ABSTRACT

A communication method for a vehicle dispatch system includes a communication apparatus configured to control communication between a first apparatus and a second apparatus. The first apparatus and the second apparatus are capable of information exchange with each other. The communication apparatus includes a processor. The processor operates to: acquire a position of a boarding point for a user and a current position of a target vehicle to be dispatched to the user; at identification timing at which a determination is made that the current position of the target vehicle belongs to a predetermined area defined with reference to the position of the boarding point, generate target vehicle information using a captured image captured by one or more cameras of the target vehicle; and transmit the target vehicle information to the second apparatus. The second apparatus operates to display the received target vehicle information on a display.

14 Claims, 17 Drawing Sheets

(51) Int. Cl.
*H04N 7/18* (2006.01)
*H04N 23/698* (2023.01)

(56) References Cited

U.S. PATENT DOCUMENTS

| | | | |
|---|---|---|---|
| 2012/0162427 A1* | 6/2012 | Lynam | H04N 5/247 348/148 |
| 2019/0080264 A1* | 3/2019 | Wasekura | G06Q 30/0207 |
| 2019/0108539 A1* | 4/2019 | Watanabe | G06Q 30/0207 |
| 2019/0122561 A1* | 4/2019 | Shimizu | G01C 21/3469 |
| 2020/0043344 A1 | 2/2020 | Shimizu et al. | |
| 2020/0132469 A1* | 4/2020 | Mehta | G01C 21/20 |

FOREIGN PATENT DOCUMENTS

| | | | |
|---|---|---|---|
| JP | H11205782 A | | 7/1999 |
| JP | 2002334395 A | * | 11/2002 |
| JP | 2002367088 A | | 12/2002 |
| JP | 2003067890 A | | 3/2003 |
| JP | 2004046404 A | | 2/2004 |
| JP | 2012088925 A | | 5/2012 |
| JP | 2012138660 A | | 7/2012 |
| JP | 2015230690 A | | 12/2015 |
| JP | 2017228115 A | * | 12/2017 |
| KR | 101859106 B1 | * | 5/2018 |
| WO | 2016075954 A1 | | 5/2016 |
| WO | 2018037954 A1 | | 3/2018 |

* cited by examiner

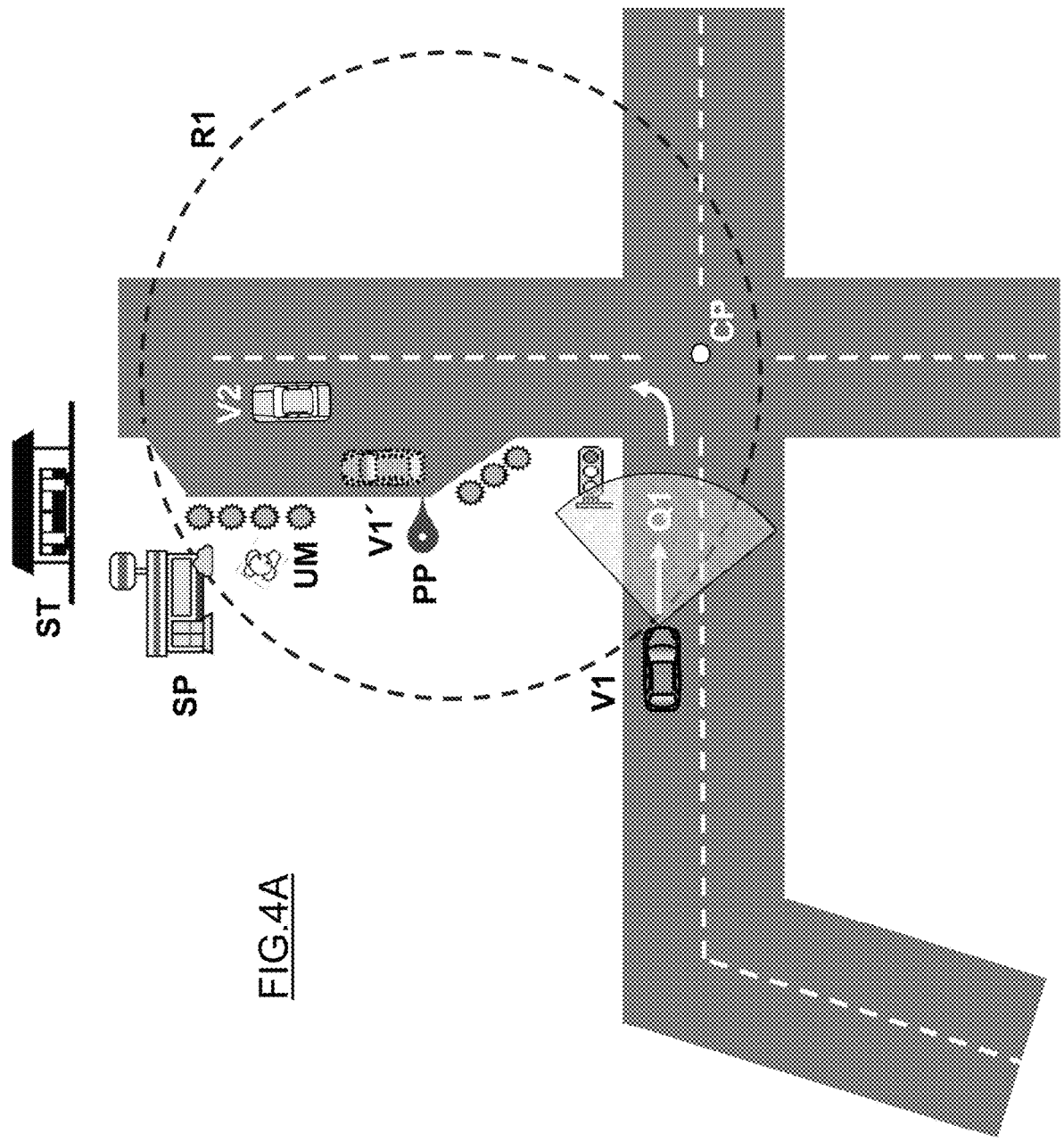

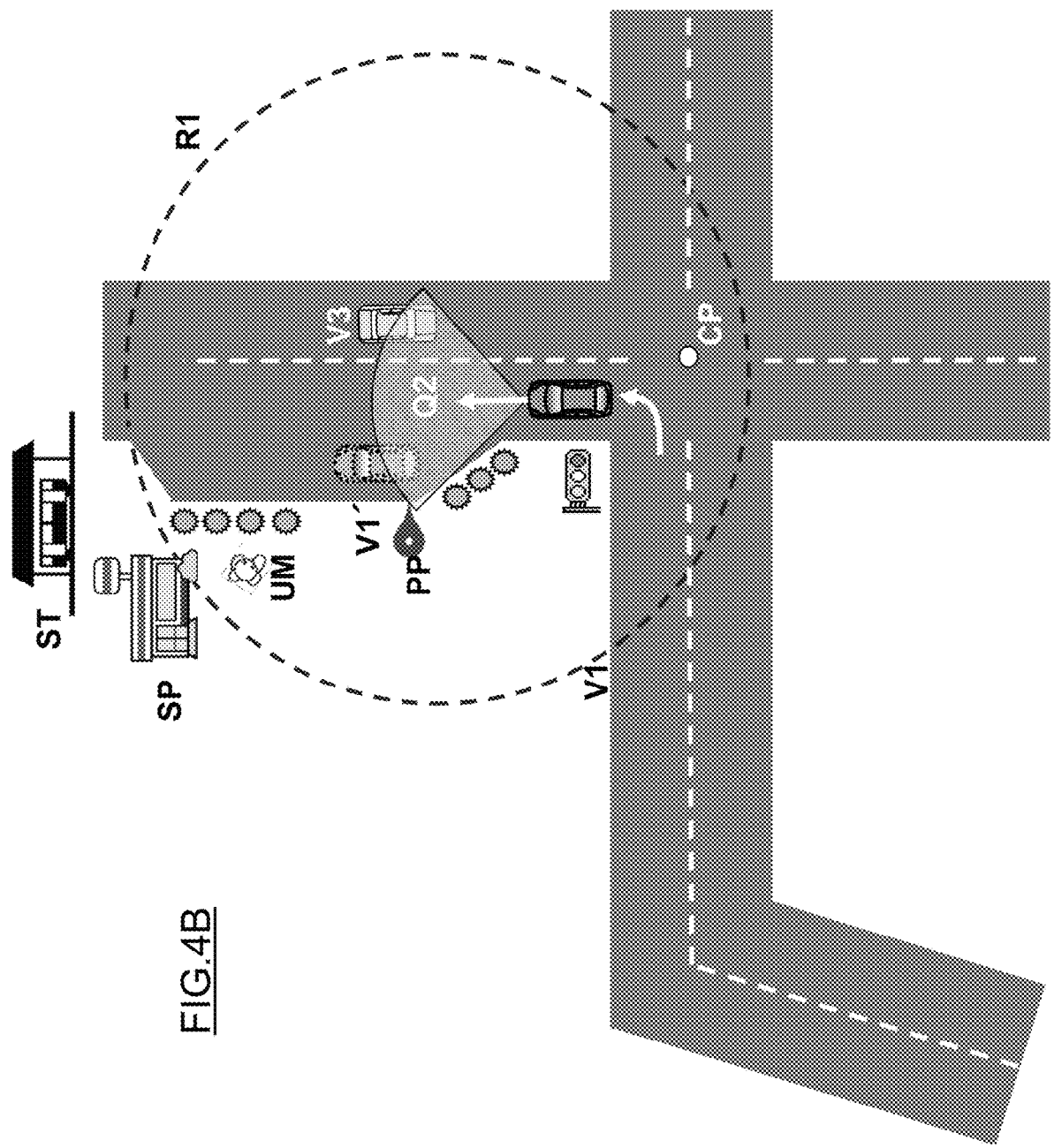

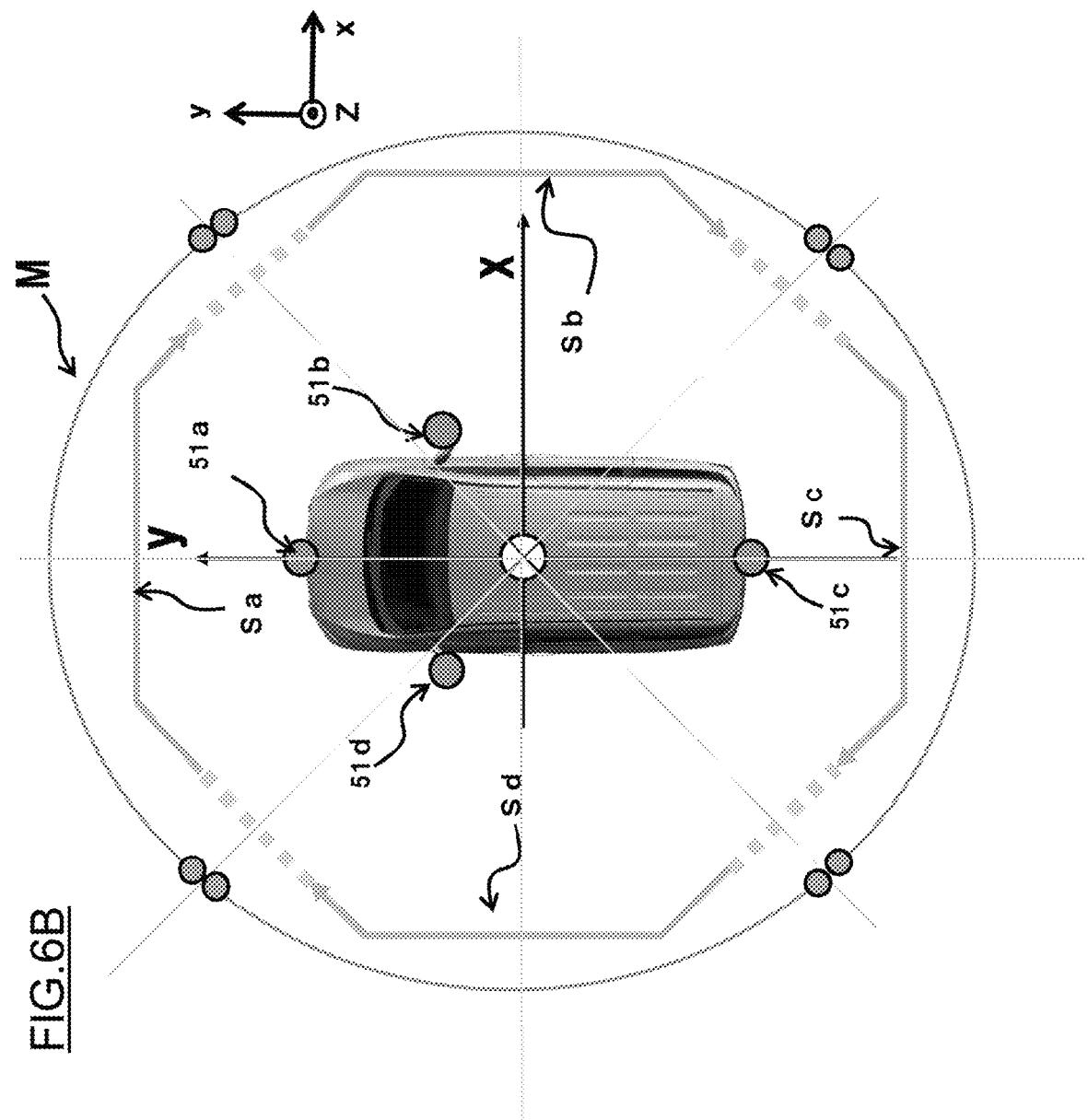

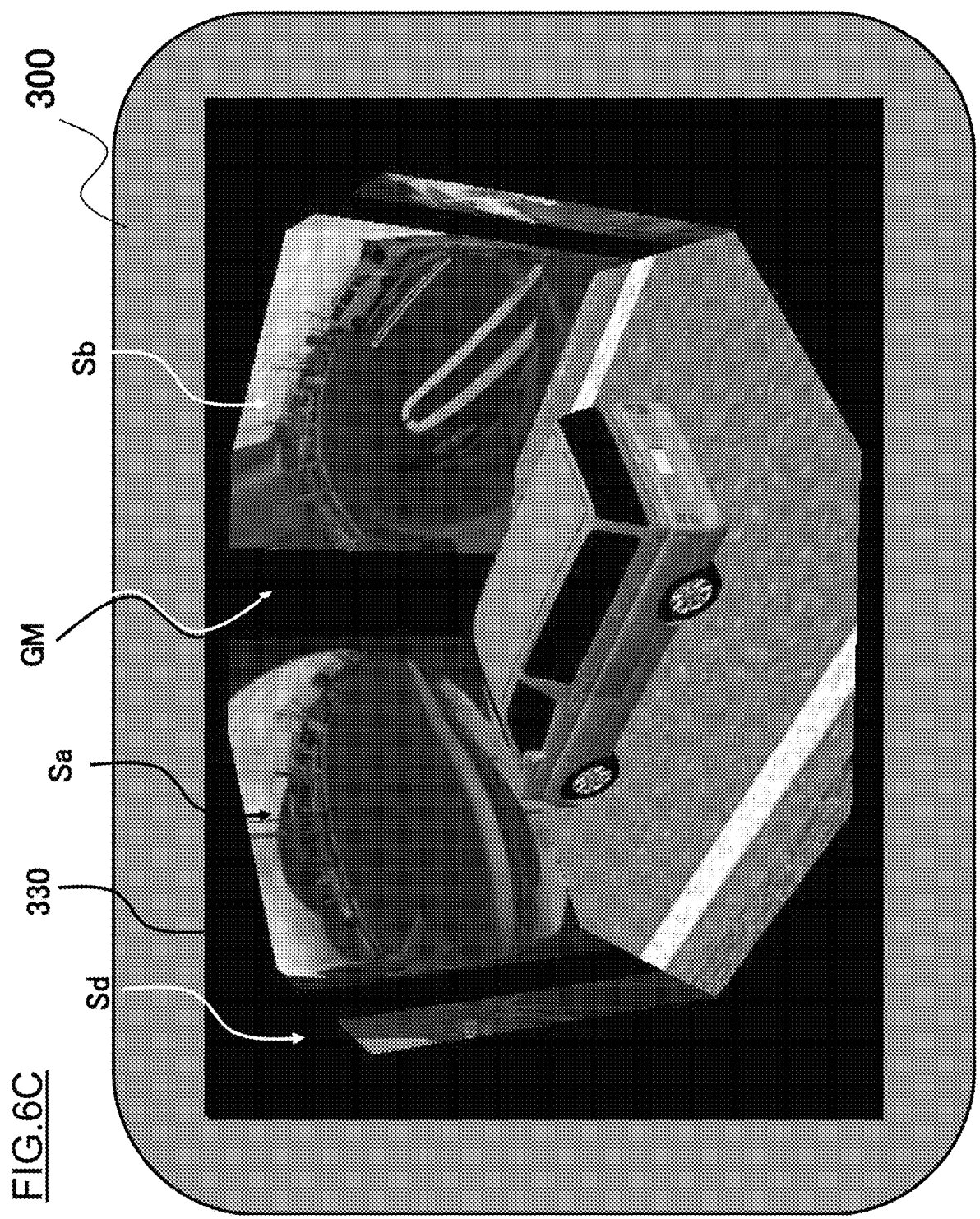

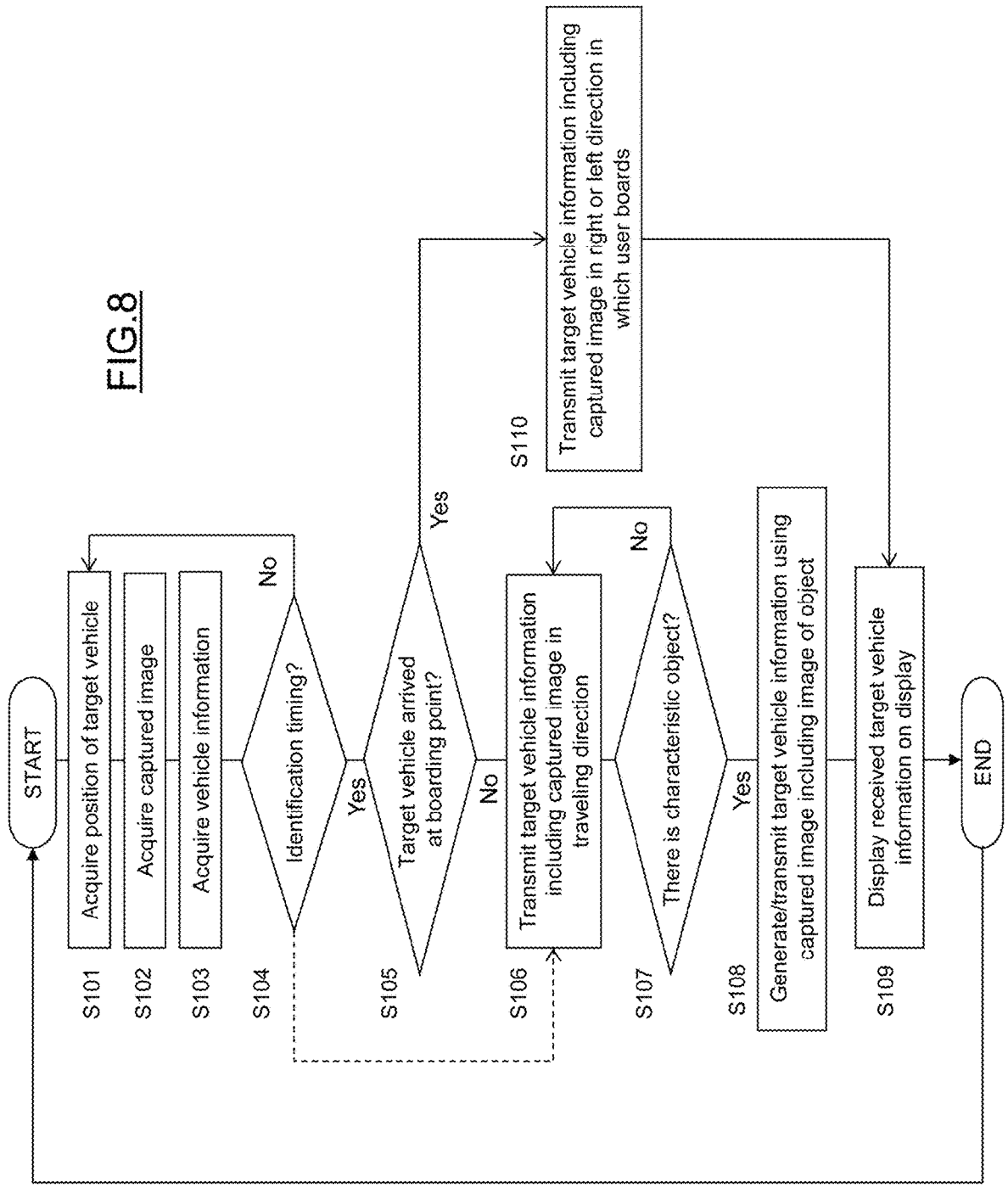

COMMUNICATION METHOD FOR VEHICLE DISPATCH SYSTEM, VEHICLE DISPATCH SYSTEM, AND COMMUNICATION DEVICE

TECHNICAL FIELD

The present invention relates to a communication method in a vehicle dispatch system, a vehicle dispatch system, and a communication apparatus.

BACKGROUND ART

To specify the vehicle dispatched to a user while protecting the privacy, a method is known which includes providing an electronic display outside a door of an automated (autonomous) driving vehicle and signaling by displaying a signal identical to the signal displayed on a user terminal (Patent Document 1).

PRIOR ART DOCUMENT

Patent Document

[Patent Document 1] U.S. Pat. No. 9,494,938B

SUMMARY OF INVENTION

Problems to be Solved by Invention

The above method has a problem in that the cost increases because an electronic display for the specific purpose has to be mounted to the outside of a vehicle.

A problem to be solved by the present invention is to provide a communication method, a vehicle dispatch system, and a communication apparatus that allow the user to specify a vehicle dispatched to the user without providing an electronic display outside the vehicle.

Means for Solving Problems

The present invention solves the above problem through transmitting target vehicle information, which is created using an image captured by an onboard camera at the timing at which a determination is made that the current position of a target vehicle belongs to a predetermined area defined with reference to the position of a boarding point for a user, to a second apparatus and displaying the target vehicle information on a display.

Effect of Invention

According to the present invention, the user can recognize the positional relationship between the position of the user and the position of a target vehicle reserved by the user and can specify the target vehicle on which the user can board.

BRIEF DESCRIPTION OF DRAWINGS

FIG. 4A is a diagram illustrating a first example of an imaging area.

FIG. 4B is a diagram illustrating a second example of an imaging area.

FIG. 6B is a second diagram for describing a panoramic image.

FIG. 6C is a third diagram for describing a panoramic image.

FIG. 8 is a chart illustrating an example of a control procedure for exchange of information between a target vehicle and a user terminal apparatus.

MODE(S) FOR CARRYING OUT THE INVENTION

Hereinafter, one or more embodiments of the present invention will be described with reference to the drawings. The embodiments will be described by exemplifying a case in which the communication method/apparatus according to the present invention is applied to a vehicle dispatch system. The control process for communication in one or more embodiments of the present invention refers to control regarding exchange of information. The control process for communication includes any one or more of a communication control process, a control process for the timing of transmitting/receiving, and a process of specifying transmitted/received information.

Figure 1:
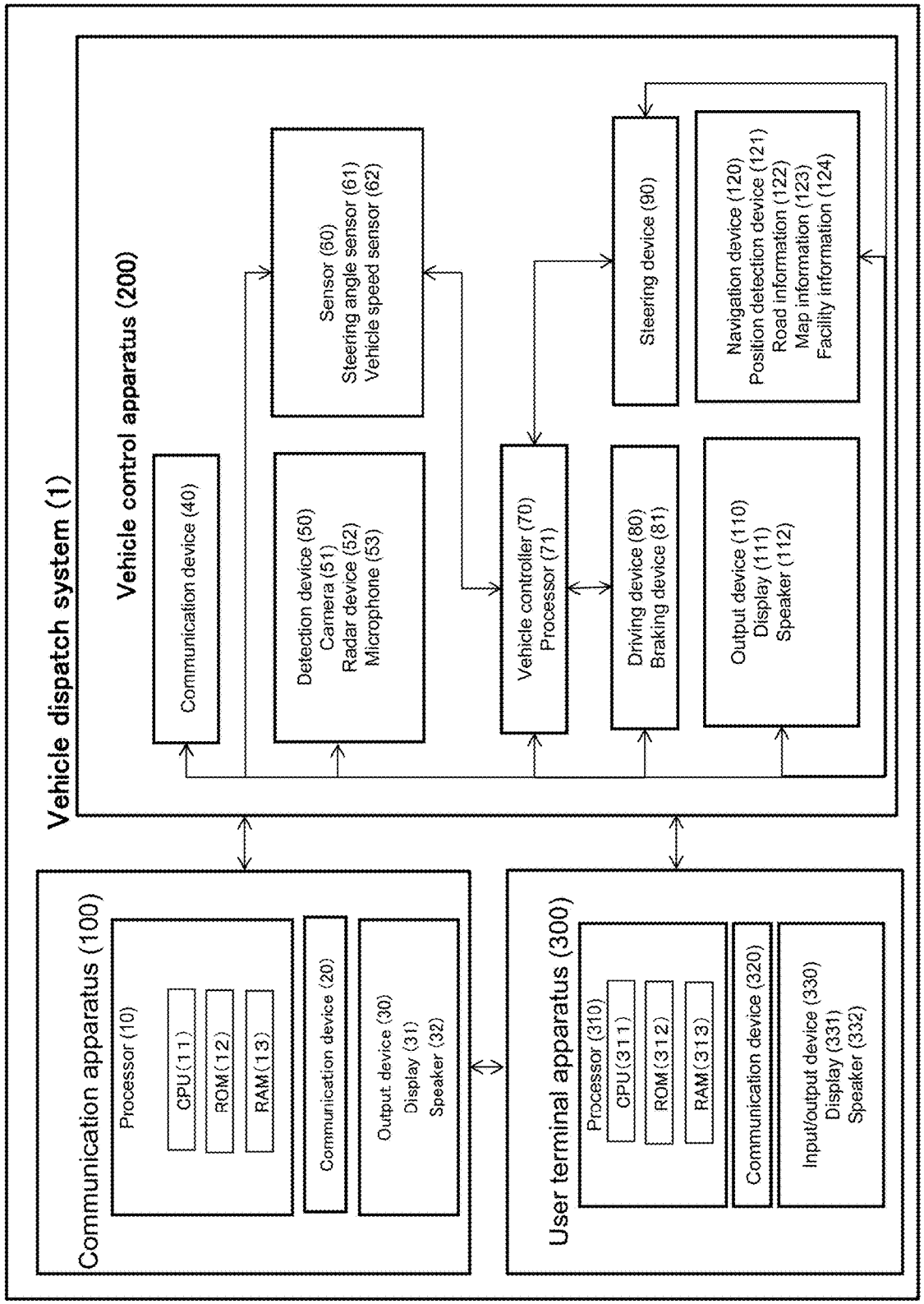
FIG. 1 is a block configuration diagram of a vehicle dispatch system using a communication apparatus according to one or more embodiments of the present invention.

FIG. 1 is a diagram illustrating the block configuration of a vehicle dispatch system 1. The vehicle dispatch system 1 according to one or more embodiments of the present invention is equipped in a vehicle and includes a communication apparatus 100, a vehicle control apparatus 200, and a user terminal apparatus 300. In the vehicle dispatch system 1, the vehicle control apparatus 200 is a first apparatus, and the user terminal apparatus 300 is a second apparatus. Each apparatus includes a processor (computer) that executes a calculation process and a communication device.

In the vehicle dispatch system 1, the first apparatus (vehicle control apparatus 200) and the second apparatus (user terminal apparatus 300), which is carried by a user, perform communication by exchange of information. The communication apparatus 100 controls the communication (exchange of information) between the first apparatus (vehicle control apparatus 200) and the second apparatus (user terminal apparatus 300).

The communication method according to the present invention is carried out by the communication apparatus 100. In FIG. 1, the communication apparatus 100 will be described as an apparatus that is configured independently of the vehicle control apparatus 200 and the user terminal apparatus 300. The communication apparatus 100 is configured on a network through which communication is possible with the vehicle control apparatus 200 and the user terminal apparatus 300.

The communication apparatus 100 is not limited in its form. The communication apparatus 100 can be incorporated in the vehicle control apparatus 200. The communication apparatus 100 can also be incorporated in the user terminal apparatus 300.

The communication apparatus 100 has a communication function to perform communication with the vehicle control apparatus 200 and the user terminal apparatus 300, and these apparatuses 100, 200, and 300 exchange information with one another via wire communication or wireless communication. The vehicle control apparatus 200 as the first apparatus includes at least one or more cameras 51. Each camera 51 is provided with a control device that receives an electronic command and operates the camera 51 on the basis of the electronic command. The cameras 51 execute an imaging operation in accordance with the electronic command. The electronic command is generated by the communication apparatus 100 and input to the cameras 51 via a communication device 40 of the vehicle control apparatus 200. The electronic command includes identification information of a plurality of cameras 51. Among the plurality of cameras 51, specific one or more cameras 51 can be controlled by the electronic command to execute the imaging operation. Each camera 51 may include a wide-angle lens. A detection device 50 is provided, which can cut out a captured image of a certain area including a predetermined imaging direction from the image captured by each camera 51. Each camera 51 may be provided with a driving device that changes the imaging direction. When the imaging direction of the camera 51 is set to a predetermined direction, the captured image can be obtained in the predetermined direction.

The user terminal apparatus 300 as the second apparatus includes at least a display 331. The display 331 is provided with a control device that receives an electronic command and operates the display 331 on the basis of the electronic command. The display 331 is a touch panel-type display that has both an output (display) function and an input reception function. The display 331 executes an operation of presenting target vehicle information, which will be described later, in accordance with the electronic command. The electronic command is generated by the communication apparatus 100 and input to the display 331 via a communication device 320 of the user terminal apparatus 300.

The vehicle control apparatus 200 according to one or more embodiments of the present invention controls the vehicle to execute autonomous traveling. Although not particularly limited, the vehicle control apparatus 200 recognizes a lane in which a target vehicle V1 is traveling, and controls the movement of the target vehicle V1 so that the position of a lane marker of the lane and the position of the target vehicle V1 maintain a predetermined relationship. The vehicle control apparatus 200 controls the movement of the target vehicle V1 so that the distance along the road width direction from a lane marker of a lane for vehicles to travel to the target vehicle V1 (i.e., the lateral position of the target vehicle V1) falls within a predetermined value range. The lane marker is not limited, provided that it has a function of defining a lane. Examples of the lane marker may include line figures drawn on a road surface, luminous bodies embedded in a road, plants existing between lanes, and road structures existing on the road shoulder side of a lane, such as guardrails, curbstones, sidewalks, and exclusive roads for two wheels. Examples of the lane marker may further include fixed physical bodies existing on the road shoulder side of a lane, such as advertising displays, signs, stores, and roadside trees.

As illustrated in FIG. 1, the vehicle control apparatus 200 according to one or more embodiments of the present invention includes the communication device 40, the detection device 50, a sensor 60, a vehicle controller 70, a driving device 80, a steering device 90, an output device 110, and a navigation device 120. These devices which constitute the vehicle control apparatus 200 are connected to one another via a controller area network (CAN) or other onboard LAN to mutually exchange information.

The detection device 50 detects the situation around the target vehicle V1. The detection device 50 detects the existence and location of a target object existing around the target vehicle V1. Although not particularly limited, the detection device 50 according to one or more embodiments of the present invention includes at least one camera 51. The camera 51 may be an infrared camera or a stereo camera. The camera 51 according to one or more embodiments of the present invention is, for example, an imaging device including an imaging element such as a CCD or a CMOS. The camera 51 is installed at a predetermined position of the target vehicle V1 and captures images of target objects around the target vehicle V1. The term "around the target vehicle" as used herein encompasses the concepts of "ahead of the target vehicle V1," "behind the target vehicle V1," "sideways ahead of the target vehicle V1," and "sideways behind the target vehicle V1." The camera 51 may be provided with a driving device that changes the imaging direction. The driving device controls the imaging direction of the camera 51. The image captured by the camera 51 provided with the driving device is associated with information on the imaging direction. Target objects to be imaged by the camera 51 include stationary physical bodies such as signs and moving physical bodies such as pedestrians and other vehicles. The signs include two-dimensional signs painted on a road surface and three-dimensional signs such as advertising displays.

When a plurality of cameras 51 is arranged, each camera 51 is associated with its identification information. The identification information includes the arranged position and imaging area of each camera 51. Each camera 51 adds its identification information to the captured image and outputs the captured image with the identification information.

The detection device 50 may analyze the image data to identify the type of a target object on the basis of the analysis result. The detection device 50 uses a pattern matching technique or the like to identify whether or not the target object included in the image data is a vehicle, a pedestrian (person), or a sign. Additionally or alternatively, the detection device 50 can extract the image of a target object from the image data and identify a specific type of the target object (such as a four-wheel vehicle, a two-wheel vehicle, a bus, a truck, or a construction vehicle), a vehicle type (small car, large car), and a special-purpose vehicle (such as an emergency car) from the size and/or shape of the image. The detection device 50 can identify the attribute of a lane, such as whether the travel lane for the target vehicle V1 is a lane for traveling straight ahead, a lane for turning right or left, or a merging lane, from the shape of a lane marker. The detection device 50 can determine an available stop position or an evacuation lane from the indication of a sign and recognize the state of a stop position for the target vehicle V1.

The detection device 50 preliminarily stores features (appearance features) on an image of the face of a user, which are acquired from the communication apparatus 100, and uses a pattern matching technique to determine a degree of coincidence with the features on the image of a target object detected as a pedestrian (person). When the degree of coincidence is a predetermined value or more, the detection device 50 determines that the detected target object is a pedestrian and is a user who has reserved the use of the target vehicle V1. The scheme of extracting a target object from the image data and the scheme of extracting the features of the face image of a target object are not particularly limited, and schemes known at the time of filing the present application can be used as appropriate.

The detection device 50 processes the acquired image data to acquire the distance from the target vehicle V1 to a target object existing around the target vehicle V1 and/or the direction in which the target object exists with respect to the target vehicle V1, on the basis of the position of the target object. Schemes known at the time of filing the present application can be appropriately used for a process of deriving travel scene information based on the image data.

Additionally or alternatively, the detection device 50 according to one or more embodiments of the present invention may use a radar device 52. Examples of the radar device 52 may be those, such as millimeter-wave radar, laser radar, and ultrasonic radar, which are known at the time of filing the present application. The detection device 50 processes the acquired measurement data to acquire the distance from the target vehicle V1 to a target object existing around the target vehicle V1 and/or the direction in which the target object exists with respect to the target vehicle V1, on the basis of the position of the target object. Schemes known at the time of filing the present application can be appropriately used for a process of deriving travel scene information based on the measurement data.

The sensor 60 according to one or more embodiments of the present invention includes a steering angle sensor 61 and a vehicle speed sensor 62. The steering angle sensor 61 detects a traveling direction based on steering information regarding the steering, such as the steering amount, steering speed, and steering acceleration of the target vehicle V1, and transmits the detected traveling direction to the communication apparatus 100 via the vehicle controller 70 and the communication device 40. The vehicle speed sensor 62 detects a traveling speed (including zero when stopping) based on the traveling direction of the target vehicle V1, the vehicle speed/acceleration of the target vehicle V1, etc. and transmits the detected traveling speed to the communication apparatus 100 via the vehicle controller 70 and the communication device 40.

The vehicle controller 70 according to one or more embodiments of the present invention is an onboard computer such as an engine control unit (ECU) and electronically controls the driving state of the vehicle. The vehicle according to one or more embodiments of the present invention may be, for example, an electric car having an electric motor as the traveling drive source, an engine car having an internal-combustion engine as the traveling drive source, or a hybrid car having both an electric motor and an internal combustion engine as the traveling drive sources. Examples of the electric car or hybrid car having an electric motor as the traveling drive source include a type in which the power source for the electric motor is a secondary battery and a type in which the power source for the electric motor is a fuel cell.

The driving device 80 according to one or more embodiments of the present invention includes a drive mechanism of the target vehicle V1. The drive mechanism includes an electric motor and/or an internal-combustion engine as the above-described traveling drive sources, a power transmission device including a drive shaft and an automatic transmission that transmit the output of the traveling drive sources to the drive wheels, and a braking device 81 that brakes the wheels. The driving device 80 generates respective control signals for these components of the drive mechanism and executes the travel control including acceleration/deceleration of the vehicle. These control signals for the drive mechanism are generated based on input signals by an accelerator operation and a brake operation and control signals acquired from the vehicle controller 70 or the communication apparatus 100. Control information may be transmitted to the driving device 80, which can thereby perform the travel control including acceleration/deceleration of the vehicle in an automated or autonomous manner. In the case of a hybrid car, the driving device 80 may receive a ratio of the torque output to the electric motor and the torque output to the internal-combustion engine in accordance with the traveling state of the vehicle.

The steering device 90 according to one or more embodiments of the present invention includes a steering actuator. The steering actuator includes a motor and other necessary components attached to the steering column shaft. The steering device 90 executes the control of changing the traveling direction of the vehicle on the basis of a control signal acquired from the vehicle controller 70 or an input signal by the steering operation. The vehicle controller 70 transmits the control information including the steering amount to the steering device 90 thereby to execute the control of changing the traveling direction. The vehicle controller 70 includes one or more processors 71 that execute the process of automated driving (autonomous traveling).

The navigation device 120 according to one or more embodiments of the present invention sets a route from the current position of the target vehicle V1 to a destination and outputs the route information to the vehicle controller 70 via the output device 110, which will be described later. The navigation device 120 includes a position detection device 121 and has road information 122 on the road type, road width, road shape, and others and map information 123 in which the road information 122 is associated with each point. The map information 123 includes facility information 124 associated with the road information 122. The facility information 124 includes the attribute of a facility and the position of the facility. The facility information 124 includes information on a so-called point of interest (POI). The position detection device 121 according to one or more embodiments of the present invention is responsible to the global positioning system (GPS) and detects the traveling position (altitude/longitude) of the vehicle which is traveling. On the basis of the current position of the target vehicle V1 detected by the position detection device 121, the navigation device 120 specifies the route along which the target vehicle V1 travels and a road link. The road information 122 according to one or more embodiments of the present invention is stored such than the information on the position of an intersection, the traveling direction in the intersection, and the type of the intersection and other information on the intersection are associated with identification information of each road link. The navigation device 120 sequentially transmits the current position of the target vehicle V1 detected by the position detection device 121 to the communication apparatus 100 at a predetermined cycle.

The output device 110 according to one or more embodiments of the present invention outputs information on the travel control based on a driving action. As the information corresponding to the control information for controlling the target vehicle V1 to travel along the target route, the information that the steering operation and/or acceleration/deceleration are to be executed is preliminarily announced to occupants of the target vehicle V1 or occupants of other vehicles via a display 111, a speaker 112, vehicle exterior lamps, and/or vehicle interior lamps. Additionally or alternatively, the output device 110 according to one or more embodiments of the present invention may output various information items regarding the travel assistance to an external device of the intelligent transport system (ITS) or the like via the communication device 40. The external device of the intelligent transport system or the like uses the information on the travel assistance, which includes the vehicle speed, steering information, travel route, etc., for the traffic management of a plurality of vehicles. When recognizing the output information, occupants of the target vehicle V1 and/or occupants of other vehicles can act in response to the behavior of the target vehicle V1 for which the travel control is performed.

The user terminal apparatus 300 will be described. The user terminal apparatus 300 is carried by the user who has reserved the use of the target vehicle. The user terminal apparatus 300 is a small computer, such as a personal digital assistant (PDA) or a smartphone, which can be carried by the user.

As illustrated in FIG. 1, the user terminal apparatus 300 includes a processor 310, the communication device 320, and an input/output device 330. The user terminal apparatus 300 exchanges information with the vehicle control apparatus 200 and/or the communication apparatus 100 via the communication device 320. The user terminal apparatus 300 may be formed integrally with the communication apparatus 100.

The input/output device 330 includes the display 331 and a speaker 332. The processor 310 of the second apparatus (user terminal apparatus 300) displays the received target vehicle information, which is transmitted from the vehicle control apparatus 200, on the display 331. The display 331 is a touch panel-type display. The display 331 receives the input of registration information from the user, reservation information from the user, and other information. The registration information includes personal information such as the name of a user and the photograph of the user's face. The reservation information includes identification information of a user, reservation date and time, identification information of a reserved target vehicle, information on a boarding point from which the use of the target vehicle is started, information on the use time, etc. The reservation information is transmitted to the communication apparatus 100. In this example, the input/output device 330 is exemplified as being provided in the second apparatus, but the input/output device 330 may be configured as different hardware than the second apparatus. The processor 310 of the second apparatus (user terminal apparatus 300) transmits an instruction for displaying the received target vehicle information, which is transmitted from the vehicle control apparatus 200, to the display 331 via some communication and causes the display 331 to execute the display process.

The communication apparatus 100 according to one or more embodiments of the present invention will be described below.

As illustrated in FIG. 1, the communication apparatus 100 according to one or more embodiments of the present invention includes a processor 10, a communication device 20, and an output device 30. The communication device 20 exchanges information with the vehicle control apparatus 200 and/or the user terminal apparatus 300. The output device 30 has a similar function to that of the previously described output device 110 of the vehicle control apparatus 200. The output device 110 of the vehicle control apparatus 200 may be used as the output device 30.

The processor 10 of the communication apparatus 100 is a computer including a read only memory (ROM) 12 that stores programs for executing the travel control of the target vehicle V1, a central processing unit (CPU) 11 as an operation circuit that executes the programs stored in the ROM 12 to serve as the communication apparatus 100, and a random access memory (RAM) 13 that serves as an accessible storage device.

The processor 10 of the communication apparatus 100 according to one or more embodiments of the present invention has an information acquisition function, an information generation function, and an output function. The processor 10 according to one or more embodiments of the present invention executes each function by cooperation of software for achieving the above functions and the above-described hardware.

The communication apparatus 100 includes a boarding point acquisition unit configured to acquire the position of a boarding point for a user, a vehicle information acquisition unit configured to acquire the current position of the target vehicle to be dispatched to the user and a captured image captured by one or more cameras of the target vehicle, a target vehicle information generation unit configured to generate target vehicle information using the captured image at identification timing at which a determination is made that the current position of the target vehicle belongs to a predetermined area defined with reference to the position of the boarding point, and a communication control unit configured to perform control so as to transmit the target vehicle information to the user terminal.

The boarding point acquisition unit and vehicle information acquisition unit of the processor 10 achieve a function of acquiring information. The target vehicle information generation unit of the processor 10 achieves a function of generating information. The communication control unit of the processor 10 achieves an output function of controlling the output.

Each function of the communication apparatus 100 according to one or more embodiments of the present invention will be described below.

The processor 10 acquires information that reflects a situation around the target vehicle V1 via the communication device 320. The processor 10 acquires one or more captured images and/or detection information from the detection device 50. The processor acquires position information detected by the navigation device 120.

The processor 10 acquires the position of the boarding point at which the user boards the target vehicle reserved by the user. The processor 10 acquires information including the current position of the target vehicle on which the user is to board (for which the user has reserved boarding). The position of the target vehicle is detected by the position detection device 121 of the navigation device 120. Information on the target vehicle includes the vehicle speed and acceleration of the target vehicle. The processor 10 acquires the speed of the target vehicle from the vehicle speed sensor 62. The speed of the target vehicle can be calculated based on a temporal change in the position of the target vehicle. The acceleration of the target vehicle can be calculated from the speed of the target vehicle. Information on the target vehicle includes the position of the target vehicle at a future time obtained from the current position and vehicle speed of the target vehicle V1. The timing of arriving at the boarding point which is the destination can be estimated from the current position, speed, and the like of the target vehicle. On the basis of the position of the target vehicle at a future time, the positional relationship between the target vehicle and the user or facility at the future time can be obtained.

Figure 2:
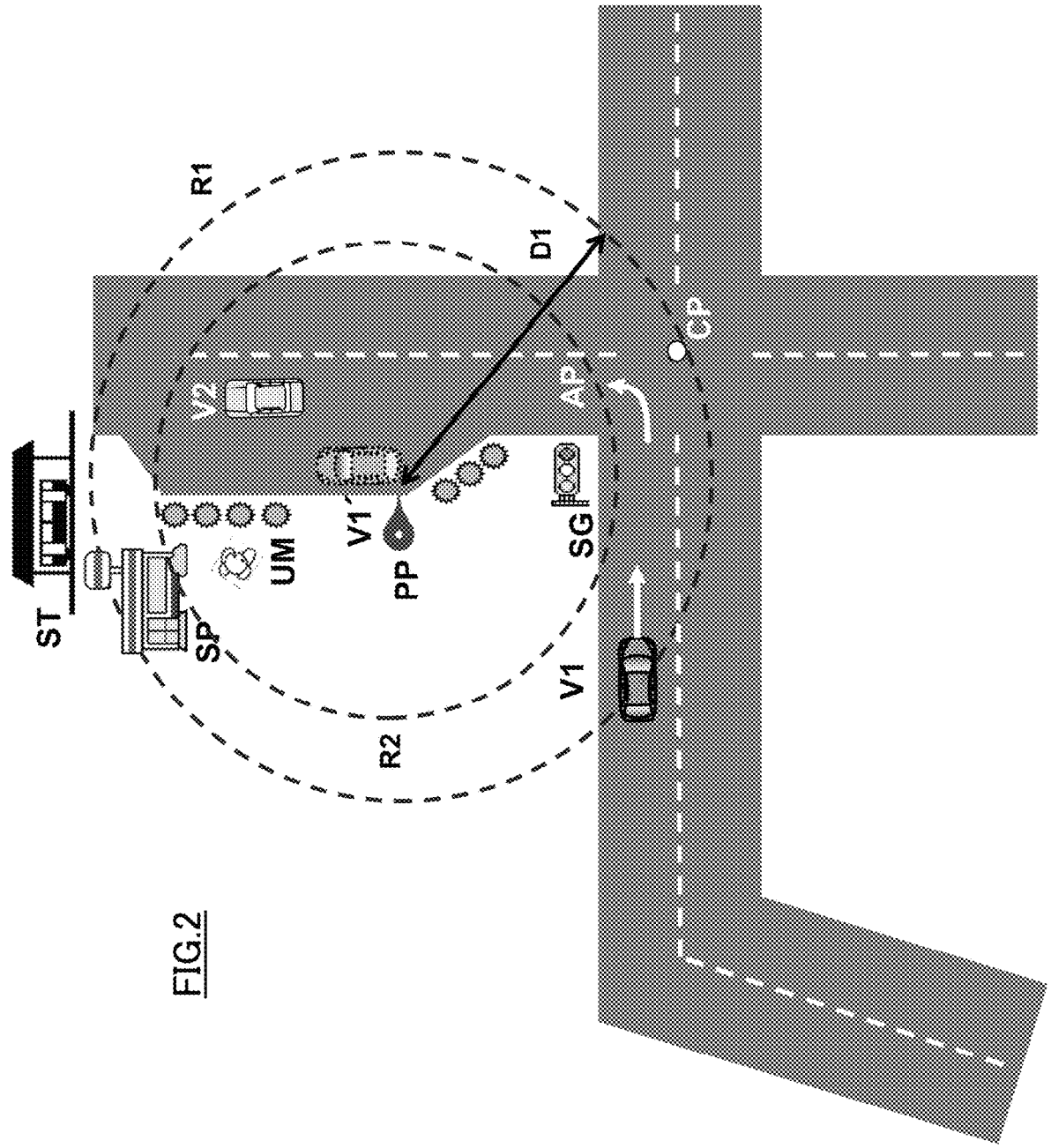
FIG. 2 is a diagram illustrating an example of the situation around a boarding point.

FIG. 2 illustrates an example of a scene in which the target vehicle V1 travels to a boarding point PP. In the scene illustrated in FIG. 2, the target vehicle V1 travels to an intersection CP, turns left at the intersection CP, and travels to the boarding point PP which is set in an evacuation area. A station ST exists ahead of the boarding point PP. A store SP exists on the left side ahead of the boarding point PP. A user UM is moving toward the boarding point PP from the store SP located behind.

The processor 10 acquires the boarding point PP included in the reservation information which is input by the user UM. The processor 10 sets a predetermined area R1 with reference to the position of the boarding point PP which is designated by the user UM. The processor 10 determines, as identification timing, the timing at which a determination is made that the current position of the target vehicle V1 belongs to the predetermined area R1. Whether or not the current position of the target vehicle V1 belongs to the predetermined area R1 may be determined based on whether or not a predetermined position of the target vehicle V1 belongs to the predetermined area R1 or may also be determined based on whether or not a part or all of the target vehicle V1 belongs to the predetermined area R1. The processor 10 generates the target vehicle information at the identification timing. The processor 10 generates the target vehicle information using a captured image GF captured by one or more cameras 51 of the target vehicle V1. The identification timing is the timing at which the target vehicle V1 (reserved vehicle) belongs to the predetermined area R1 with reference to the boarding point PP for the user UM, and this timing is therefore the timing at which the user UM who expects to use the target vehicle V1 becomes aware of the location of the target vehicle V1. At this timing, the processor 10 generates the target vehicle information using the captured image GF indicating the situation around the target vehicle V1. The processor 10 transmits the target vehicle information, which is generated at the identification timing, to the user terminal apparatus 300 which is the second apparatus. The user terminal apparatus 300 displays the target vehicle information on the display 331, and the user UM can therefore recognize the target vehicle information at the timing at which the user UM desires to confirm the location of the target vehicle V1. The target vehicle information in this case includes the captured image GF indicating the situation around the target vehicle V1 at that timing.

The processor 10 generates the target vehicle information at the identification timing at which a determination is made that the current position of the target vehicle V1 belongs to the predetermined area R1 which is a range of a predetermined distance D1 from the boarding point PP. The identification timing is set to the timing at which the target vehicle V1 enters the range of the predetermined distance D1 from the boarding point PP, and the user UM can therefore recognize the target vehicle information GM at the timing at which the target vehicle V1 approaches the boarding point PP, the reservation time is getting close, and the user UM desires to confirm the location of the target vehicle V1. The target vehicle information GM in this case includes the captured image GF indicating the surrounding situation at that timing.

The processor 10 generates the target vehicle information at the identification timing at which a determination is made that the current position of the target vehicle V1 belongs to a predetermined area R2 that is a range to which a passing point AP at the intersection CP closest to the boarding point PP belongs. The route for the target vehicle V1 is calculated by the navigation device 120. The navigation device 120 refers to the map information 123 and the road information 122 and can extract the intersection CP (intersection CP closest to the boarding point PP) through which the target vehicle V1 traveling along the route finally passes before reaching the boarding point PP. The information on the intersection CP is transmitted to the communication apparatus 100. The target vehicle information is generated and transmitted at the timing of passing through the intersection CP closest to the boarding point PP, and the user UM can therefore confirm the target vehicle information GM at the timing at which the user UM desires to confirm the location of the target vehicle V1. The target vehicle information GM in this case includes the captured image GF indicating the surrounding situation at that timing.

The processor 10 generates the target vehicle information GM at the identification timing at which the request for the target vehicle information GM is received from the user UM. The timing at which the user UM requests the target vehicle information GM is the timing at which the user UM desires to positively confirm the location/situation of the target vehicle V1. If the location/situation of the target vehicle V1 cannot be confirmed when the user UM comes close to the vicinity of the boarding point PP, or if the user UM may delay in the arrival at the boarding point PP, the user UM can confirm the location/situation of the target vehicle V1. The processor 10 generates the target vehicle information GM in response to the request from the user UM and presents the target vehicle information GM to the user UM. The user UM can confirm the target vehicle information GM at the timing at which the user UM desires to confirm the location of the target vehicle V1. The target vehicle information GM in this case includes the captured image GF indicating the surrounding situation at that timing.

Figure 3:
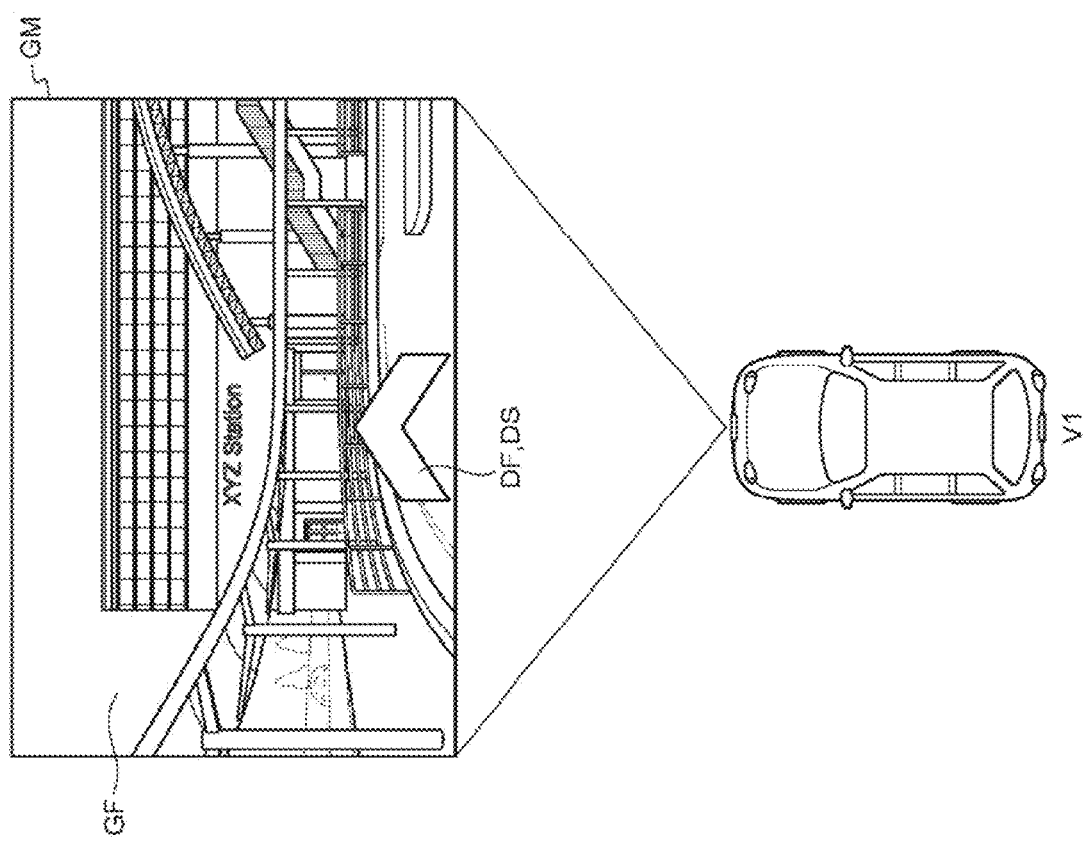
FIG. 3 is a diagram illustrating an example of target vehicle information.

FIG. 3 illustrates an example of the target vehicle information GM generated using the captured image GF captured ahead of the target vehicle V1. The target vehicle information GM further includes traveling direction information DF that indicates the traveling direction of the target vehicle V1. The traveling direction information DF may be represented by a graphic indicating a direction, such as an arrow or a triangle.

As illustrated in FIG. 4A, the processor 10 generates the target vehicle information GM including the captured image GF in the traveling direction of the target vehicle V1. The imaging direction in an imaging area Q1 is common to the traveling direction. The processor 10 transmits a command to acquire and transmit the captured image GF in the traveling direction to the vehicle control apparatus 200. As illustrated in FIG. 4B, at the point at which the vehicle has passed through the last intersection CP (intersection CP closest to the boarding point PP) before reaching the boarding point PP, the target vehicle information GM including the captured image GF in the traveling direction of the target vehicle V1 is generated. The imaging direction in the imaging area Q1 is common to the traveling direction.

The station ST exists in the traveling direction of the target vehicle V1 illustrated in FIG. 4B. The captured image GF in the traveling direction of the target vehicle V1 includes an image of the station ST (see FIG. 3). The target vehicle information GM generated at this timing includes the captured image GF of the station ST. The user UM who has designated the boarding point PP may have already recognized the situation around the boarding point PP. The user UM who has found the target vehicle information GM can estimate the traveling direction of the target vehicle V1. On the basis of the traveling direction of the target vehicle V1, a determination can be made as to from which direction the target vehicle V1 approaches the boarding point PP. This allows the user UM to specify the target vehicle V1 on which the user UM can board.

Figure 4C:
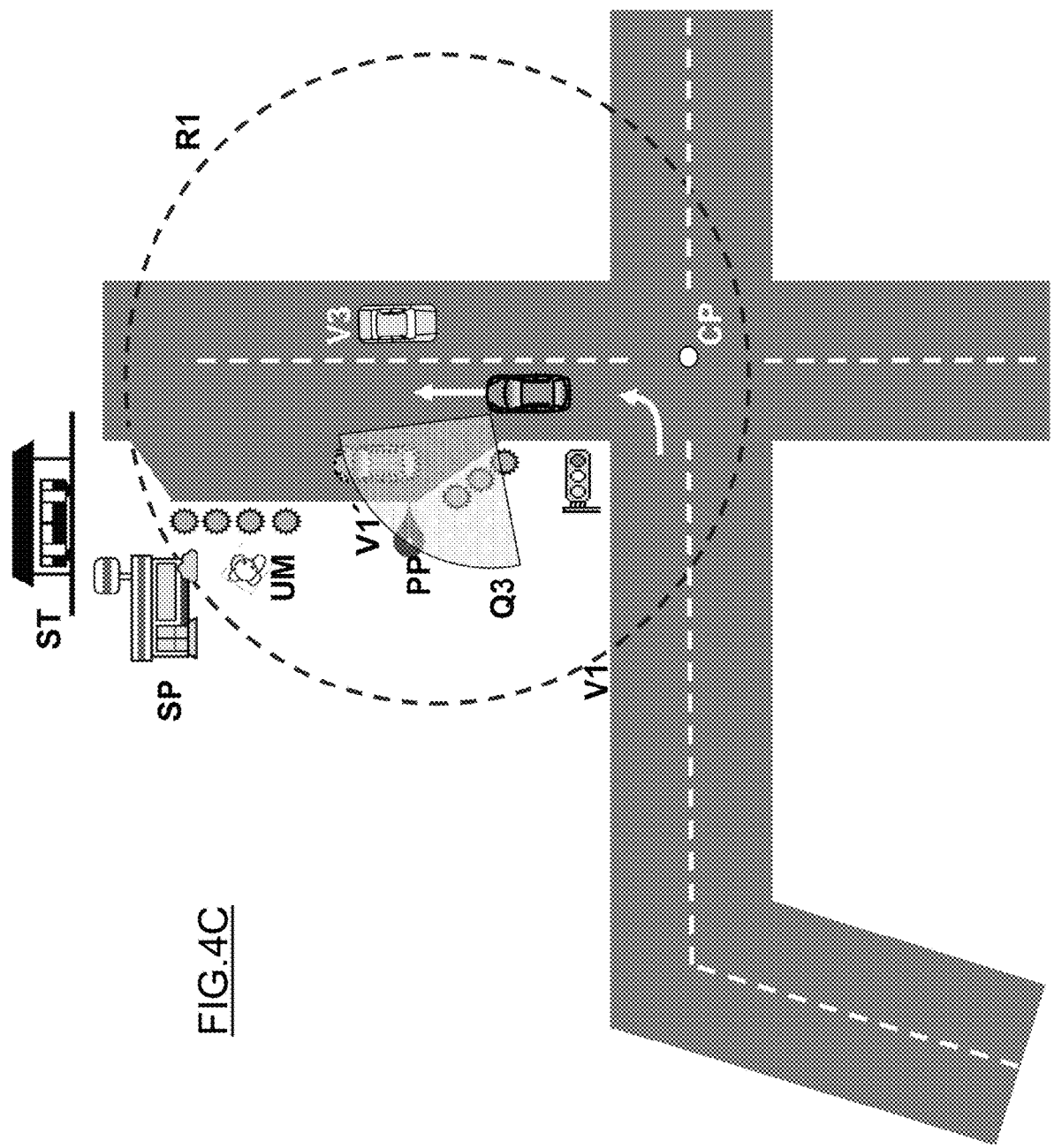
FIG. 4C is a diagram illustrating a third example of an imaging area.

As illustrated in FIG. 4C, the processor 10 generates the target vehicle information GM using the captured image GF captured in the direction in which the boarding point PP is located with respect to the target vehicle V1. In this case, the traveling direction of the target vehicle V1 and the imaging direction are different. The imaging direction is a direction toward the boarding point PP. The boarding point PP may be included in an imaging area Q3. The moving target vehicle V1 approaches the boarding point PP. The boarding point PP is a point designated by the user UM, and the user UM is also moving toward the boarding point PP. The user UM who has found the captured image GF in the direction toward the boarding point PP can determine from which direction the target vehicle V1 approaches the boarding point PP. This allows the user UM to specify the target vehicle V1 on which the user UM can board.

Figure 4D:
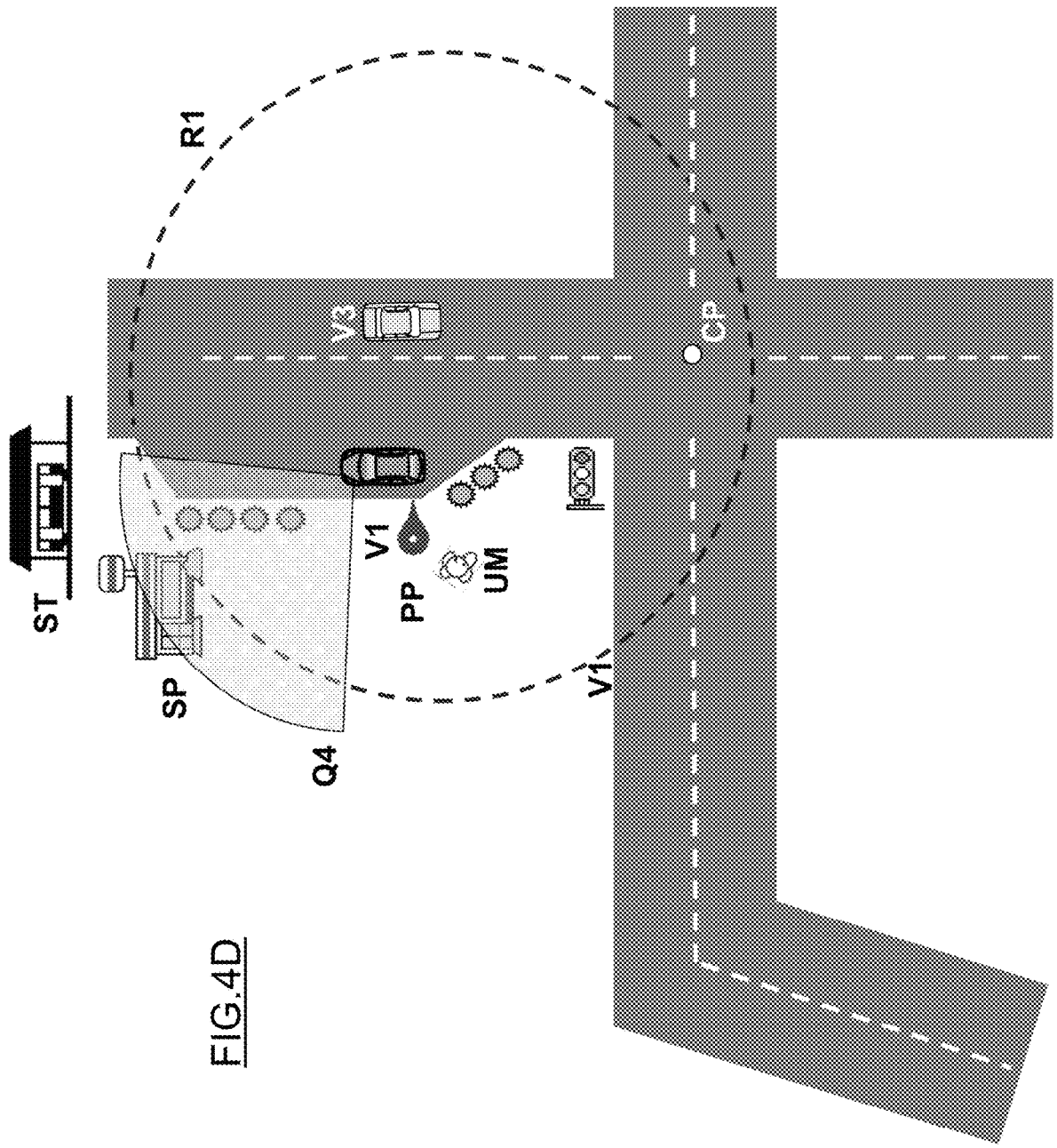
FIG. 4D is a diagram illustrating a fourth example of an imaging area.

The processor 10 transmits a command to capture the image of a facility located around the boarding point PP to the vehicle control apparatus 200. The processor 10 refers to the facility information 124 included in the map information 123 to search for a facility existing in the vicinity of the boarding point PP and creates the target vehicle information GM using the captured image GF in the direction in which the facility is located with respect to the target vehicle V1. The processor 10 transmits an instruction including information for specifying the facility located around the boarding point PP to the vehicle control apparatus 200 or may also refer to the map information 123 and the facility information 124 and transmit an instruction including the imaging direction, which is a direction in which the facility exists with respect to the target vehicle V1, to the vehicle control apparatus 200. For example, as illustrated in FIG. 4D, an instruction to capture the captured image GF including the image of the shop SP located ahead on the left may be transmitted to the vehicle control apparatus 200. The imaging direction in an imaging area Q4 is the direction in which the shop SP exists when viewed from the target vehicle V1. The imaging area Q4 includes the shop SP. The position of the shop SP can be determined with reference to the facility information 124 of the navigation device 120. The user UM who has designated the boarding point PP may have already known facilities around the boarding point PP. When confirming the facilities included in the target vehicle information GM, the user UM can estimate the traveling direction of the target vehicle V1. On the basis of the traveling direction of the target vehicle V1, the user UM can estimate from which direction the target vehicle V1 approaches the boarding point PP. This allows the user UM to specify the target vehicle V1 which the user UM has reserved.

When the target vehicle V1 is traveling, the processor 10 generates the target vehicle information GM including the captured image GF in the traveling direction of the target vehicle V1, while when the target vehicle V1 makes a stop in the vicinity of the boarding point PP, the processor 10 generates the target vehicle information GM including the captured image GF in the right or left direction in which the user UM boards and/or alights. The captured image GF on the left or right side of the target vehicle V1 located at the boarding point PP is an image captured behind the user UM who is approaching the target vehicle V1. The user UM can specify the target vehicle V1 by comparing the situation behind the user UM with the target vehicle information GM.

The processor 10 generates the target vehicle information GM using the captured image GF including the image of a physical body. When the captured image GF includes the image of a physical body, such as another vehicle, a pedestrian, or a bicycle, which the target vehicle V1 approaching the boarding point PP passes each other, the target vehicle V1 can be specified based on the positional relationship between the target vehicle V1 and the physical body. In particular, when the physical body is a moving body, the positional relationship between the moving body (physical body) and the target vehicle V1 is limited in the timing, and the target vehicle V1 can therefore be specified based on the captured image GF of the moving body (physical body).

Figure 4E:
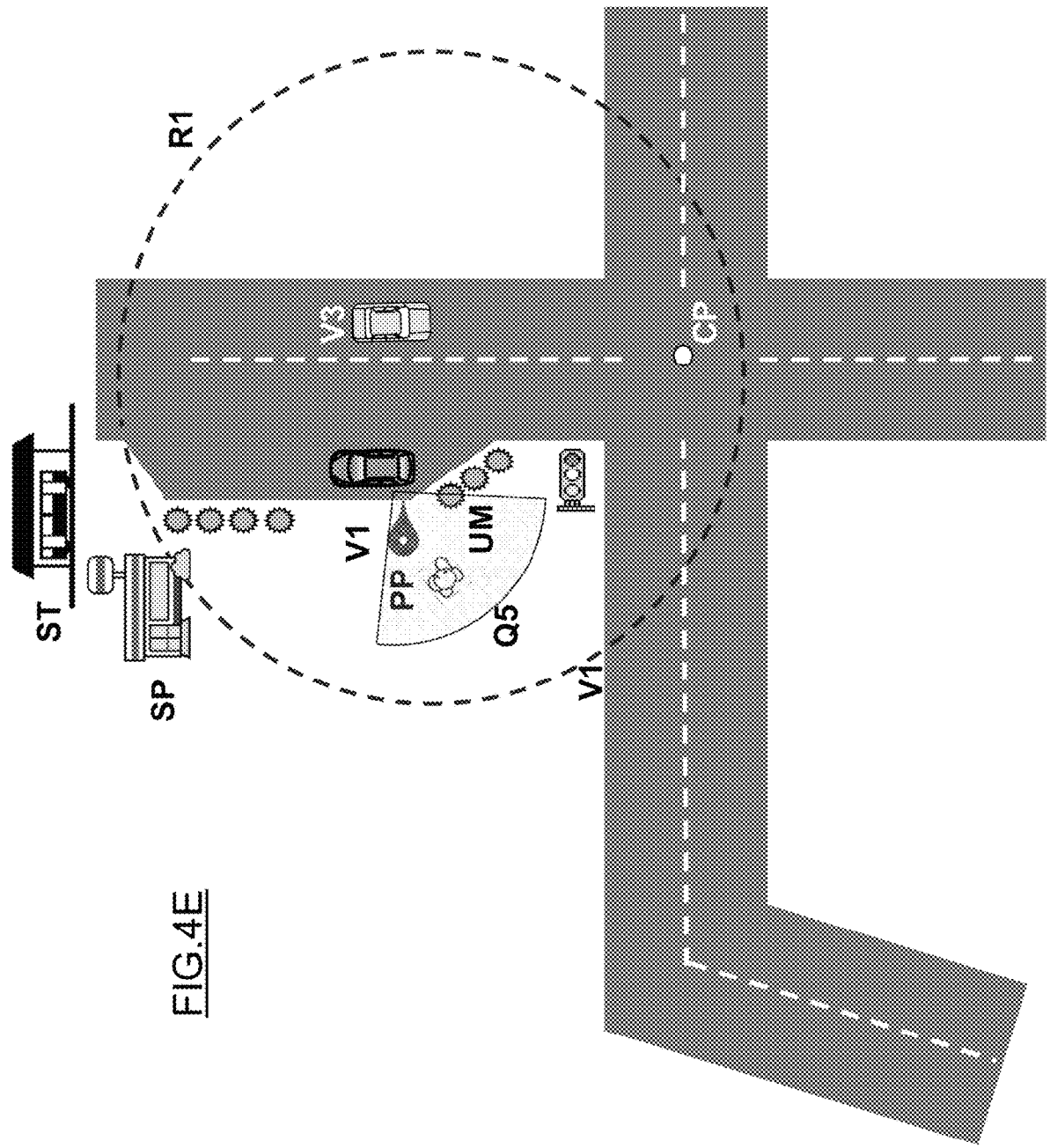
FIG. 4E is a diagram illustrating a fifth example of an imaging area.

As illustrated in FIG. 4E, the processor 10 generates the target vehicle information GM using the captured image GF captured in a direction in which the user UM is located with respect to the target vehicle V1. The imaging direction in an imaging area Q5 is a direction in which the user UM is located. The imaging area Q5 includes the user UM. The processor 10 acquires the position information detected by the position detection device of the user terminal apparatus 300 as the position of the user UM. It is highly possible that the captured image GF in the direction in which the user UM is located includes an image of the user UM. The user UM can determine the traveling direction of the target vehicle V1 with reference to the captured image GF including the image of the user UM and can specify the target vehicle V1.

The processor 10 acquires a face image of the user UM and generate the target vehicle information GM using the captured image GF including an image having a predetermined degree of coincidence with the face image of the user UM. As illustrated in FIG. 4E, the imaging direction in the imaging area Q5 is a direction in which the face of the user UM is located. The imaging area Q5 includes the face of the user UM. The processor 10 makes matching between the features of face information, which is preliminarily registered by the user, and the features of a person's face included in the captured image GF to determine the location of the user UM. The target vehicle information GM is generated using the captured image GF including an image of the face of the user UM. The traveling direction of the target vehicle V1 can be determined with reference to the captured image GF including the face of the user UM, and the target vehicle V1 can be specified.

The processor 10 generates the target vehicle information GM including the imaging direction. The target vehicle information GM includes imaging direction information DS indicating the imaging direction. The display form of the imaging direction information DS is similar to that of the traveling direction information DF illustrated in FIG. 3, and the imaging direction information DS may be represented by a graphic indicating a direction, such as an arrow or a triangle. In the example illustrated in FIG. 3, the traveling direction and the imaging direction are common, but the imaging direction may be a different direction than the traveling direction. The imaging direction may be a direction in which a facility exists or a direction in which the user UM is located. The target vehicle information GM includes the imaging direction information DS indicating the imaging direction with reference to the target vehicle V1; therefore, the user UM can determine the imaging direction of the onboard camera or cameras 51 and can specify the target vehicle V1 with reference to the target vehicle information GM in which the captured image GF is used.

Figure 4F:
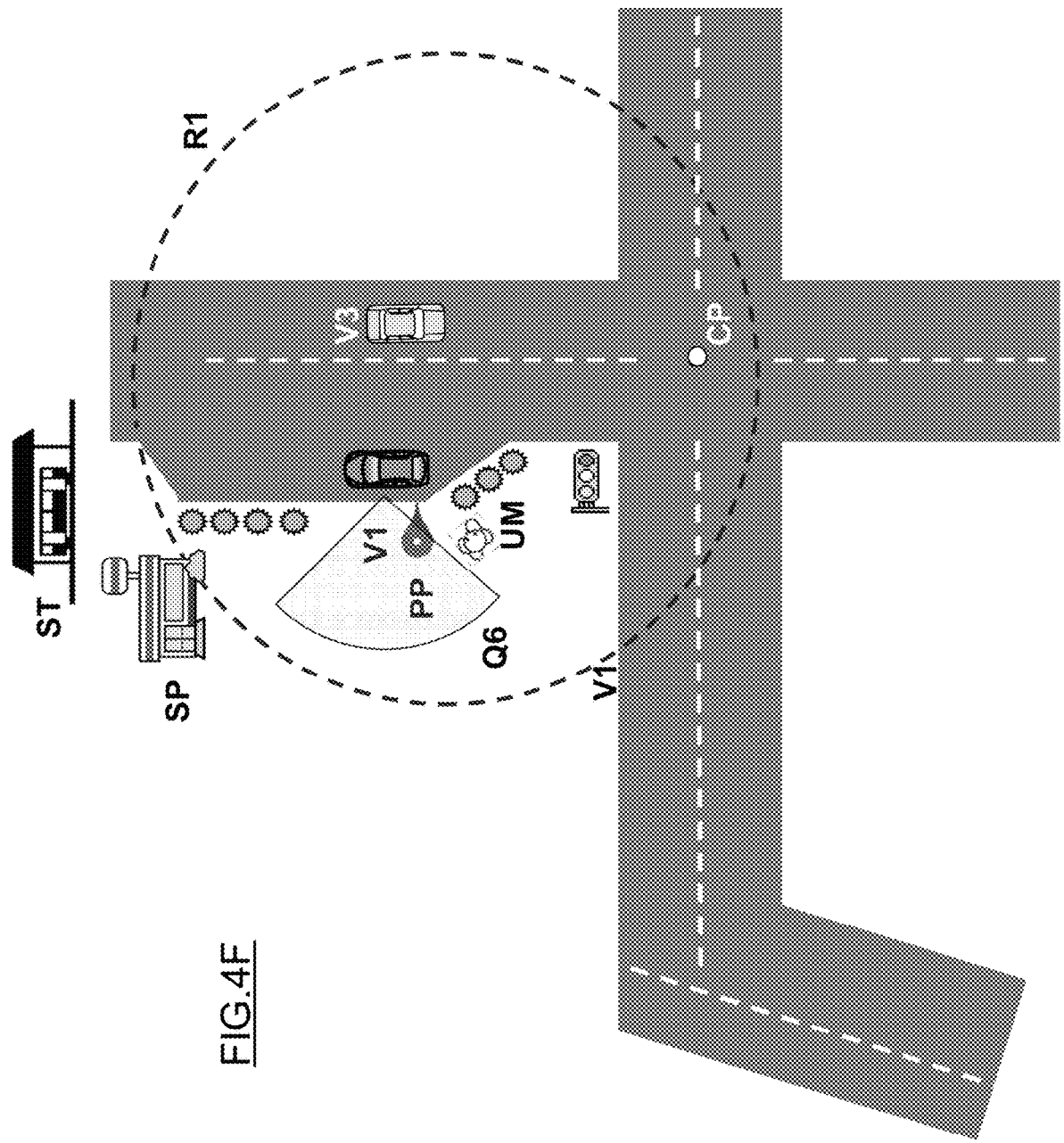
FIG. 4F is a diagram illustrating a sixth example of an imaging area.

When the target vehicle V1 makes a stop in the vicinity of the boarding point PP, the processor 10 generates the target vehicle information GM including the captured image GF in the right or left direction in which the user UM boards and/or alights. In the example illustrated in FIG. 4F, the left-side direction is set as the imaging direction, and the captured image GF of an imaging area Q6 is acquired. When a determination is made that the target vehicle V1 arrives at the boarding point PP, the target vehicle V1 makes a stop in the vicinity of the boarding point PP. The processor 10 determines this timing as the identification timing. The direction in which the user UM boards and/or alights is a direction on the road shoulder side. The processor 10 refers to the road information 122 and the map information 123 to determine whether the road shoulder side is the right or left side of a lane in which the target vehicle V1 travels. The roadside refers to a side on which lanes in the same direction are not adjacent to each other. Regarding the captured image GF in the right or left direction, the arrangement of the cameras 51 with respect to the vehicle is preliminarily stored in the processor 10 or the vehicle controller 70. When acquiring the captured image GF in the right direction, the processor 10 causes the right camera 51 of the target vehicle V1 to execute an imaging instruction. When acquiring the captured image GF in the left direction, the processor 10 causes the left camera 51 of the target vehicle V1 to execute an imaging instruction.

The form of the target vehicle information GM according to one or more embodiments of the present invention is not limited.

The processor 10 generates the target vehicle information GM including an overhead image obtained by combining the captured images GF captured by a plurality of cameras 51 of the target vehicle V1. The overhead image is an image in which the captured images GF captured by the plurality of cameras 51 arranged at respective positions of the front, rear, right, and left of the vehicle are connected and the roof of the target vehicle V1 is viewed from a virtual viewpoint above. The overhead image includes screen images of the entire circumferential area around the target vehicle V1. The user UM can recognize the situation around the target vehicle V1 with reference to the target vehicle information GM including the overhead image.

Figure 5A:
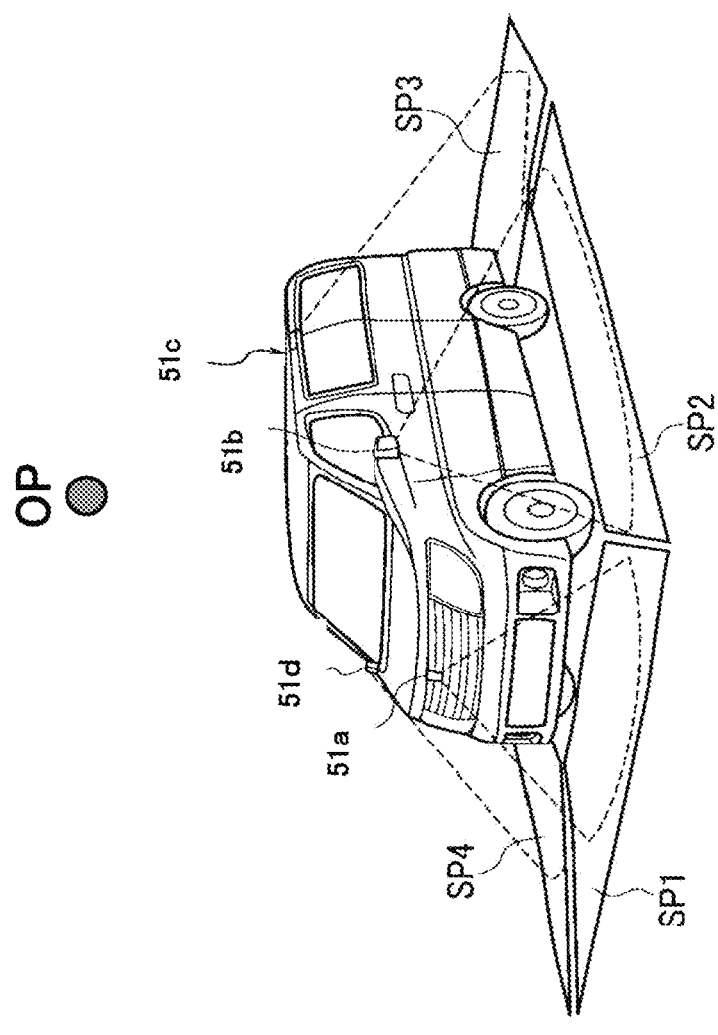
FIG. 5A is a first diagram for describing an overhead image.
Figure 5B:
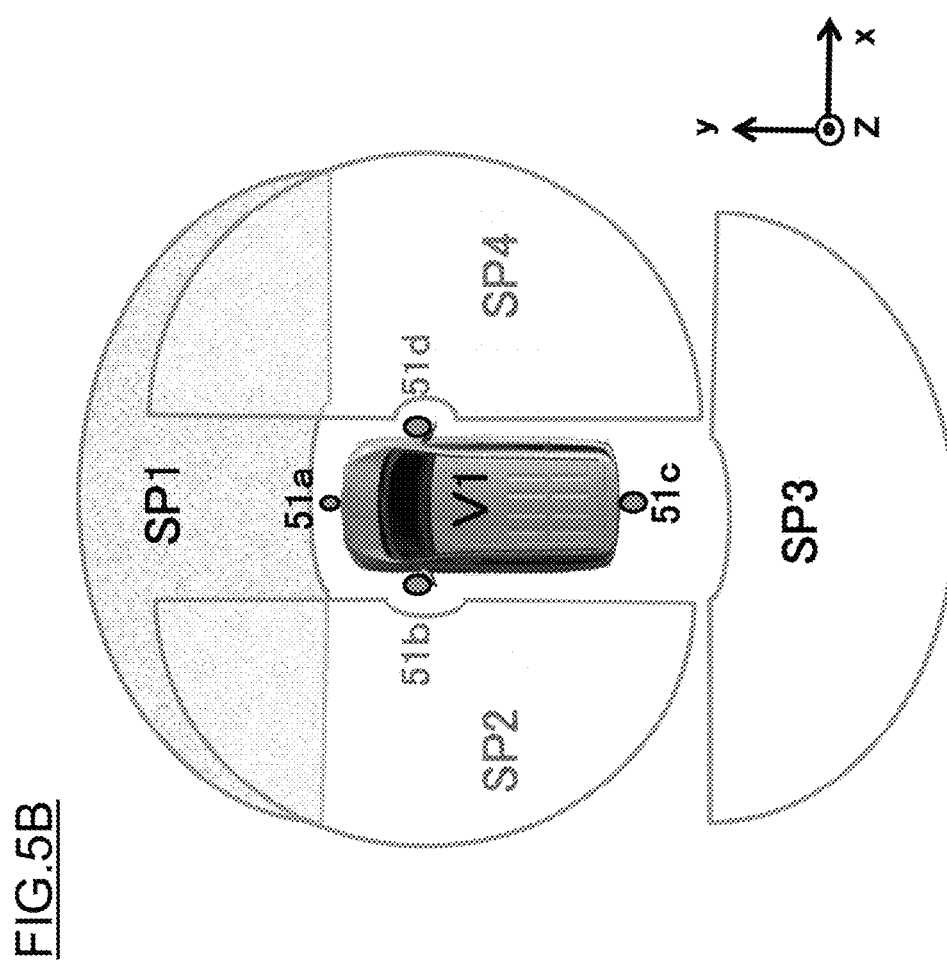
FIG. 5B is a second diagram for describing an overhead image.

For example, as illustrated in FIG. 5A, camera 51a installed at a predetermined position in front of the target vehicle V1, such as the front grill portion, captures the image of a front area SP1 and a space located ahead of the area SP1. The captured image GF (front view) of a space including the area SP1 is obtained. Camera 51b installed at a predetermined position on the left side of the target vehicle V1, such as a left-side mirror portion, captures the image of a left-side area SP2 and a space around the area SP2. The captured image GF (left-side view) of a space including the area SP2 is obtained. Camera 51c installed at a predetermined position of the rear portion of the target vehicle V1, such as a rear finisher portion or a roof spoiler portion, captures the image of an area SP3 behind the target vehicle V1 and a space behind the area SP3. The captured image GF (rear view) of a space including the area SP3 is obtained. Camera 51d installed at a predetermined position on the right side of the target vehicle V1, such as a right-side mirror portion, captures the image of an area SP4 on the right side of the target vehicle V1 and a space around the area SP4. The captured image GF (right side view) of a space including the area SP4 is obtained. FIG. 5B is a diagram illustrating the arrangement of the cameras 51a to 51d and the top surface (roof) of the target vehicle V1 viewed from a virtual viewpoint OP that is set above the areas SP1 to SP4. As illustrated in FIG. 5B, the front view, left-side view, rear view, and right-side view are converted into common plane coordinates (X-Y coordinates), and one surrounding monitoring image is created through combining the overlapping portions and correcting the image distortion in the overlapping portions.

The processor 10 generates the target vehicle information GM including a panoramic image obtained by combining the captured images GF captured by a plurality of cameras 51 of the target vehicle V1. The panoramic image is an image in which the captured images GF captured by the plurality of cameras 51 arranged at respective positions of the front, rear, right, and left of the vehicle are connected and projected to coordinates that are set to surround the circumference of the vehicle. The panoramic image includes screen images of the entire circumferential area around the target vehicle V1. The user UM can recognize the situation around the target vehicle V1 with reference to the target vehicle information GM including the panoramic image.

Figure 6A:
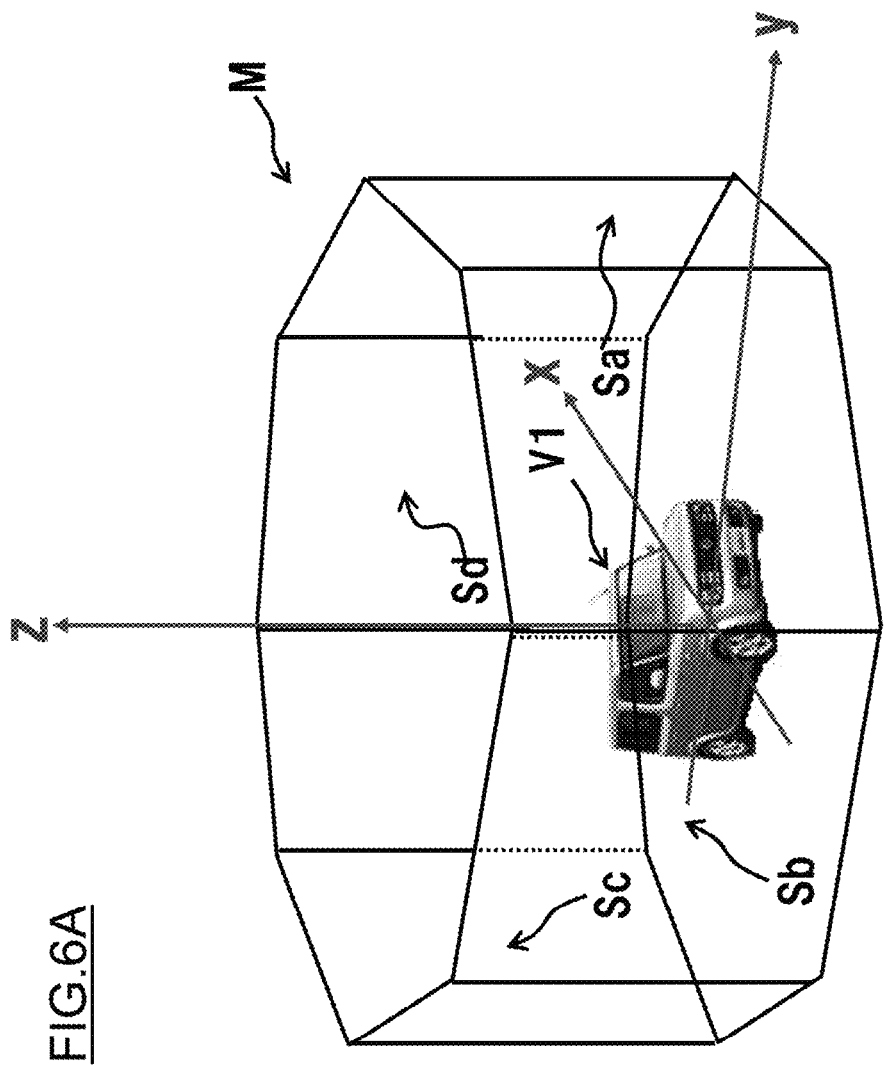
FIG. 6A is a first diagram for describing a panoramic image.

The panoramic image is obtained by projecting the captured images GF onto a projection model. The projection model can be preliminarily defined. In this example, as illustrated in FIG. 6A, a projection model M of a columnar body is employed, in which the ground surface (traveling surface) of a vehicle is the bottom surface. Mapping information is prepared in advance for projecting the acquired captured images GF onto projection planes that are set on the side surfaces of the projection model M of the columnar body. The mapping information is information that associates the coordinates of the captured images GF with the coordinates of the model M. FIG. 6B is a schematic cross-sectional view along the xy plane of the projection model M illustrated in FIG. 6A.

The projection model M illustrated in FIGS. 6A and 6B is a regular octagonal columnar body having a regular octagonal bottom surface and a height along the vertical direction (z-axis direction in the figure). The shape of the projection model M is not limited and can also be a cylindrical columnar body, a rectangular columnar body such as a triangular columnar body, a square columnar body, or a hexagonal columnar body, or a triangular columnar body having a polygonal bottom surface and triangular side surfaces.

Projection surfaces Sa, Sb, Sc, and Sd (collectively referred to as a projection surface S, hereinafter) are set on the inner side surfaces of the projection model M to project screen images around the target vehicle V1 which is in contact with the bottom surface of the projection model M. The captured image GF captured ahead of the target vehicle V1 is projected onto the projection plane Sa located in the imaging direction of the camera 51a, the captured image GF captured on the right side of the target vehicle V1 is projected onto the projection plane Sb located in the imaging direction of the camera 51b, the captured image GF captured behind the target vehicle V1 is projected onto the projection plane Sc located in the imaging direction of the camera 51c, and the captured image GF captured on the left side of the target vehicle V1 is projected onto the projection plane Sd located in the imaging direction of the camera 51d, The captured images GF projected onto the projection model M are screen images that can be seen as if when looking around the passenger car V. FIG. 6C illustrates an example of the target vehicle information GM displayed on the user terminal apparatus 300. Another projection plane S can be displayed by operating the touch panel-type display 331 of the user terminal apparatus 300 to designate a virtual viewpoint.

The processor 10 generates the target vehicle information GM including a three-dimensional projection image obtained by projecting the captured images GF, which are captured by the plurality of the cameras 51 of the target vehicle V1, to three-dimensional coordinates. The three-dimensional projection image is an image in which the captured images GF captured by the plurality of cameras 51 arranged at respective positions of the front, rear, right, and left of the vehicle are connected and projected to three-dimensional coordinates that are set to surround the circumference of the vehicle. The three-dimensional image includes screen images of the entire circumferential area around the target vehicle V1. The user UM can recognize the situation around the target vehicle V1 with reference to the target vehicle information GM including the three-dimensional image.

Figure 7A:
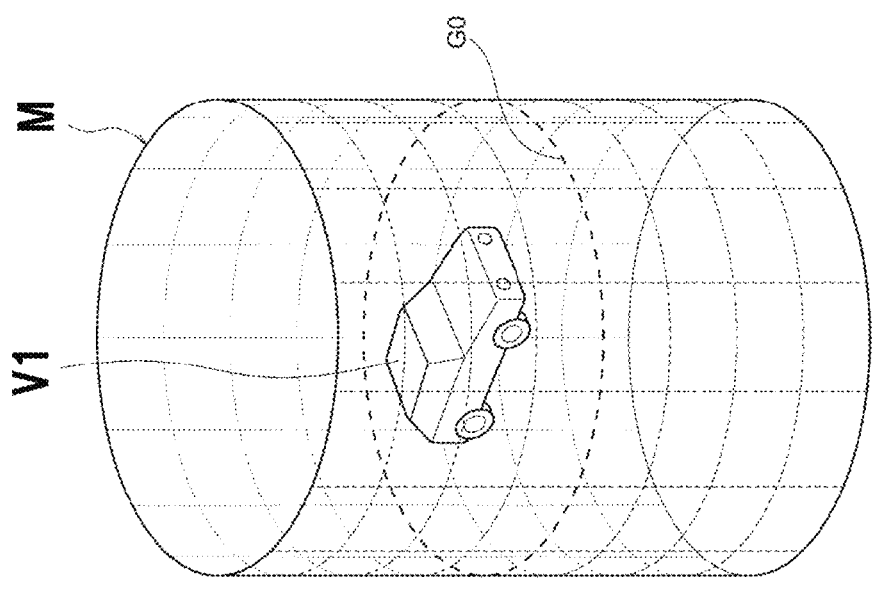
FIG. 7A is a first diagram for describing a three-dimensional projection image.
Figure 7B:
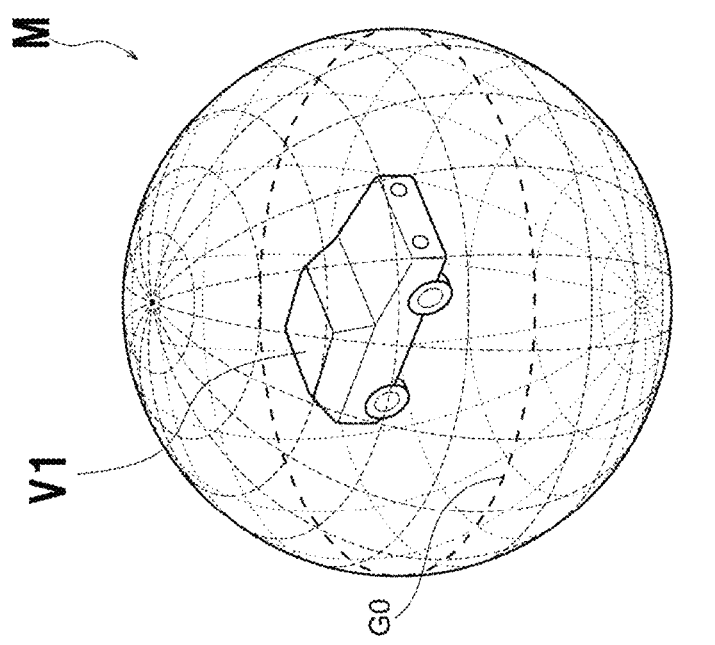
FIG. 7B is a second diagram for describing a three-dimensional projection image.

The shape of the three-dimensional coordinate system is not limited. FIG. 7A illustrates an example of a three-dimensional coordinate system M having a cylindrical shape. The three-dimensional coordinate system M is set such that the target vehicle V1 is located on a plane GO that is set in the cylinder. FIG. 7B illustrates an example of a spherical three-dimensional coordinate system M. The three-dimensional coordinate system M is set such that the target vehicle V1 is located on a plane GO that is set in the sphere. The shape of the three-dimensional coordinate system M as the projection model may be a bowl shape as disclosed in JP2012-138660A published by the Japan Patent Office. Mapping information is prepared in advance for projecting the acquired captured images GF onto the projection plane of the three-dimensional coordinate system M. The mapping information is information that associates the coordinates of the captured images GF with the coordinates of the three-dimensional coordinate system M.

The control procedure executed in the communication apparatus 100 according to one or more embodiments of the present invention will be described with reference to the flowchart of FIG. 8. The content of the process in each step is as described above, so the description will be made with a central focus on the process flow.

In step S101, the processor 10 acquires the current position of the target vehicle V1. In step S102, the processor 10 acquires the captured image GF from a camera 51. When there is a plurality of cameras 51, identification information including the arrangement information of the cameras 51 (information on the positions at which the cameras 51 are provided) is acquired together with the captured images GF. In step S103, the processor 10 acquires the vehicle information such as the traveling direction and speed of the target vehicle.

In step S104, the processor 10 determines whether it is the identification timing. The identification timing is the timing at which a determination is made that the current position of the target vehicle V1 belongs to the predetermined area R1 which is defined with reference to the position of the boarding point PP. Alternatively, the identification timing may be the timing at which a determination is made that the current position of the target vehicle V1 belongs to the predetermined area R1 which is a range of the predetermined distance D1 from the boarding point PP. Alternatively, the identification timing may be the timing at which a determination is made that the current position of the target vehicle V1 belongs to the predetermined area R2 which is a range to which the passing point at the intersection CP closest to the boarding point PP belongs. Alternatively, the identification timing may be the timing at which a request for the target vehicle information GM is received from the user UM.

In step S105, the processor 10 determines whether or not the target vehicle V1 has arrived at the boarding point PP. The current position of the target vehicle V1 is compared with the boarding point PP designated in the reservation made by the user UM, and when the difference is smaller than a predetermined value, a determination is made that the target vehicle V1 has arrived at the boarding point PP. On the other hand, when the target vehicle V1 has not arrived at the boarding point PP, the process proceeds to step S106.

In step S106, the processor 10 generates the target vehicle information GM including the captured image GF in the traveling direction of the target vehicle V1 and transmits the generated target vehicle information GM to the user terminal apparatus 300. The imaging direction may also be a direction in which the boarding point PP for the target vehicle V1 is located. In step S107, the processor 10 determines whether or not there is a characteristic object (a facility, a physical body, a user) around the target vehicle V1. When there is a characteristic object, the process proceeds to step S108, in which the target vehicle information GM is generated using the captured image GF including an image of the object and the generated target vehicle information GM is transmitted to the user terminal apparatus 300. The user UM is presented with the target vehicle information GM which includes the image of a facility such as a shop SP or a station ST, the image of an object such as another vehicle, a pedestrian, or a bicycle, or the image of the user UM who has reserved the target vehicle V1. The user UM can know the traveling direction of the target vehicle V1 with reference to the target vehicle information GM and can specify the target vehicle reserved by the user UM from among vehicles traveling toward the boarding point PP.

Referring again to step S105, when the target vehicle V1 has arrived at the boarding point PP, the process proceeds to step S110. In step S110, the processor 10 generates the target vehicle information GM including the captured image GF in the right or left direction in which the user UM boards. The direction in which the user UM boards (the right or left side in the vehicle width direction) is on the road shoulder side of the lane in which the target vehicle V1 travels. This information can be determined based on the road information 122 of the navigation device 120. The road information 122 includes information as to whether the road shoulder is located on the right or left side of the traveling direction in the lane and information as to whether an adjacent lane is located on the right or left side of the traveling direction in the lane. On the basis of the road information 122, the processor 10 can determine whether the user UM can board the target vehicle V1 from the right or left direction with respect to the lane. The processor 10 transmits, to a camera 51, an imaging instruction in which the imaging direction is the direction for the user UM to board. The processor 10 transmits the acquired target vehicle information GM to the user terminal apparatus 300. Then, the process proceeds to step S109, in which the processor 310 of the user terminal apparatus 300 displays the target vehicle information GM on the display 331.

The communication apparatus 100 according to one or more embodiments of the present invention is configured and operates as the above and therefore exhibits the following effects.

(1) According to the communication method in one or more embodiments of the present invention, the processor 10 acquires the boarding point PP for the user UM and the current position of the target vehicle V1 to be dispatched, and at the identification timing at which a determination is made that the current position of the target vehicle V1 belongs to the predetermined area R1 defined with reference to the position of the boarding point PP, the processor 10 generates the target vehicle information GM using the captured image or images captured by one or more cameras 51 of the target vehicle V1. The processor 10 transmits the generated target vehicle information GM to the user terminal apparatus 300 (second apparatus). The user terminal apparatus 300 displays the received target vehicle information GM on the display 311.

The identification timing is the timing at which the target vehicle (reserved vehicle) belongs to the predetermined area with reference to the boarding point for the user, that is, the timing at which the user who expects to use the target vehicle becomes aware of the location of the target vehicle. At this timing, the processor 10 generates the target vehicle information GM using the captured image GF indicating the situation around the target vehicle and transmits the generated target vehicle information to the user terminal apparatus 300. The user terminal apparatus 300 displays the target vehicle information GM on the display 331. The user can recognize the target vehicle information GM at the timing at which the user desires to confirm the location of the target vehicle. The target vehicle information GM in this case includes the captured image GF indicating the surrounding situation at that timing. Thus, the processor 10 allows the vehicle control apparatus 200 (first apparatus), which includes the detection device 50, and the user terminal apparatus 300 (second apparatus) to exchange appropriate information at appropriate timing.

(2) According to the communication method in one or more embodiments of the present invention, at the identification timing at which a determination is made that the current position of the target vehicle V1 belongs to the predetermined area which is a range of the predetermined distance D1 from the boarding point PP, the target vehicle information GM is generated. The identification timing is set to the timing at which the target vehicle V1 enters the range of the predetermined distance D1 from the boarding point PP, and the user UM can therefore recognize the target vehicle information GM at the timing at which the user UM desires to confirm the location of the target vehicle V1 which has approached the boarding point PP (the reservation time is getting close). The target vehicle information GM in this case includes the captured image GF indicating the surrounding situation at that timing.

(3) According to the communication method in one or more embodiments of the present invention, the processor 10 generates the target vehicle information GM at the identification timing at which a determination is made that the current position of the target vehicle V1 belongs to the predetermined area R2 that is a range to which the passing point AP at the intersection CP closest to the boarding point PP belongs. The route for the target vehicle V1 is calculated by the navigation device 120. The user UM is presented with the target vehicle information GM which is generated at the timing of passing through the intersection CP closest to the boarding point PP. The user UM can confirm the target vehicle information GM at the timing at which the user UM desires to confirm the location of the target vehicle V1. The target vehicle information GM in this case includes the captured image GF indicating the surrounding situation at that timing.

(4) According to the communication method in one or more embodiments of the present invention, the processor 10 generates the target vehicle information GM at the identification timing at which the request for the target vehicle information GM is received from the user UM. The timing at which the user UM requests the target vehicle information GM is the timing at which the user UM desires to positively confirm the location/situation of the target vehicle V1. The processor 10 generates the target vehicle information GM in response to the request from the user UM and presents the target vehicle information GM to the user UM. The user UM can confirm the target vehicle information GM at the timing at which the user UM desires to confirm the location of the target vehicle V1. The target vehicle information GM in this case includes the captured image GF indicating the surrounding situation at that timing.

(5) According to the communication method in one or more embodiments of the present invention, the processor 10 generates the target vehicle information GM including the captured image GF in the traveling direction of the target vehicle V1. The user UM who has designated the boarding point PP may have already recognized the situation around the boarding point PP. The user UM who has found the target vehicle information GM can estimate the traveling direction of the target vehicle V1. On the basis of the traveling direction of the target vehicle V1, a determination can be made as to from which direction the target vehicle V1 approaches the boarding point PP. This allows the user UM to specify the target vehicle V1 on which the user UM can board.

(6) According to the communication method in one or more embodiments of the present invention, the processor 10 generates the target vehicle information GM using the captured image GF captured in the direction in which the boarding point PP is located with respect to the target vehicle V1. The target vehicle V1 approaches the boarding point PP, which is a point designated by the user UM. The user UM is also moving toward the boarding point PP. The user UM who has found the captured image GF in the direction toward the boarding point PP can determine from which direction the target vehicle V1 approaches the boarding point PP. This allows the user UM to specify the target vehicle V1 on which the user UM can board.

(7) According to the communication method in one or more embodiments of the present invention, when the target vehicle V1 makes a stop in the vicinity of the boarding point PP, the processor 10 generates the target vehicle information GM including the captured image GF in the right or left direction in which the user UM boards and/or alights. The captured image GF on the left or right side of the target vehicle V1 located at the boarding point PP is an image captured behind the user UM who is approaching the target vehicle V1. The user UM can specify the target vehicle V1 by comparing the situation behind the user UM with the target vehicle information GM.

(8) According to the communication method in one or more embodiments of the present invention, the processor 10 refers to the facility information 124 included in the map information 123 to search for a facility existing in the vicinity of the boarding point PP and generates the target vehicle information GM using the captured image GF in the direction in which the facility is located with respect to the target vehicle V1.

The user UM who has designated the boarding point PP may have already known facilities around the boarding point PP. When confirming the facilities included in the target vehicle information GM, the user UM can estimate the traveling direction of the target vehicle V1. On the basis of the traveling direction of the target vehicle V1, the user UM can estimate from which direction the target vehicle V1 approaches the boarding point PP. This allows the user UM to specify the target vehicle V1 which the user UM has reserved.

(9) According to the communication method in one or more embodiments of the present invention, the processor 10 generates the target vehicle information GM using the captured image GF including the image of a physical body. When the captured image GF includes the image of a physical body, such as another vehicle, a pedestrian, or a bicycle, which the target vehicle V1 approaching the boarding point PP passes each other, the target vehicle V1 can be specified based on the positional relationship between the target vehicle V1 and the physical body. In particular, when the physical body is a moving body, the positional relationship between the moving body (physical body) and the target vehicle V1 is limited in the timing, and the target vehicle V1 can therefore be specified based on the captured image GF of the moving body (physical body).

(10) According to the communication method in one or more embodiments of the present invention, the processor 10 generates the target vehicle information GM using the captured image GF captured in a direction in which the user UM is located with respect to the target vehicle V1. The processor 10 acquires the position information detected by the position detection device of the user terminal apparatus 300 as the position of the user UM. It is highly possible that the captured image GF in the direction in which the user UM is located includes an image of the user UM. The user UM can determine the traveling direction of the target vehicle V1 with reference to the captured image GF including the image of the user UM and can specify the target vehicle V1.

(11) According to the communication method in one or more embodiments of the present invention, the processor 10 acquires a face image of the user UM and generates the target vehicle information GM using the captured image GF including an image having a predetermined degree of coincidence with the face image of the user UM. The processor 10 makes matching between the features of face information, which is preliminarily registered by the user, and the features of a person's face included in the captured image GF to determine the location of the user UM. The target vehicle information GM is generated using the captured image GF including an image of the face of the user UM. The traveling direction of the target vehicle V1 can be determined with reference to the captured image GF including the face of the user UM, and the target vehicle V1 can be specified.

(12) According to the communication method in one or more embodiments of the present invention, the processor 10 generates the target vehicle information GM including the imaging direction. The target vehicle information GM includes imaging direction information DS indicating the imaging direction. The target vehicle information GM includes the imaging direction information DS indicating the imaging direction with reference to the target vehicle V1, and the user UM can therefore determine the traveling direction of the target vehicle V1 to specify the target vehicle V1.

(13) According to the communication method in one or more embodiments of the present invention, the processor 10 generates the target vehicle information GM including an overhead image obtained by combining the captured images GF captured by a plurality of cameras 51 of the target vehicle V1. The overhead image is an image in which the captured images GF captured by the plurality of cameras 51 arranged at respective positions of the front, rear, right, and left of the vehicle are connected and the roof of the target vehicle V1 is viewed from a virtual viewpoint above. The overhead image includes screen images of the entire circumferential area around the target vehicle V1. The user UM can recognize the situation around the target vehicle V1 with reference to the target vehicle information GM including the overhead image.

(14) According to the communication method in one or more embodiments of the present invention, the processor 10 generates the target vehicle information GM including a panoramic image obtained by combining the captured images GF captured by a plurality of cameras 51 of the target vehicle V1. The panoramic image is an image in which the captured images GF captured by the plurality of cameras 51 arranged at respective positions of the front, rear, right, and left of the vehicle are connected and projected to coordinates that are set to surround the circumference of the vehicle. The panoramic image includes screen images of the entire circumferential area around the target vehicle V1. The user UM can recognize the situation around the target vehicle V1 with reference to the target vehicle information GM including the panoramic image.

(15) According to the communication method in one or more embodiments of the present invention, the processor 10 generates the target vehicle information GM including a three-dimensional projection image obtained by projecting the captured images GF, which are captured by the plurality of the cameras 51 of the target vehicle V1, to three-dimensional coordinates. The three-dimensional projection image is an image in which the captured images GF captured by the plurality of cameras 51 arranged at respective positions of the front, rear, right, and left of the vehicle are connected and projected to three-dimensional coordinates that are set to surround the circumference of the vehicle. The three-dimensional image includes screen images of the entire circumferential area around the target vehicle V1. The user UM can recognize the situation around the target vehicle V1 with reference to the target vehicle information GM including the three-dimensional image.

(16) The vehicle dispatch system 1 according to one or more embodiments of the present invention exhibits similar actions and effects to those obtained in the above-described communication method.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1 Vehicle dispatch system
100 Communication apparatus
  10 Processor
    11 CPU

12 ROM
13 RAM
20 Communication device
30 Output device
　31 Display
　32 Speaker
200 Vehicle control apparatus
　40 Communication device
　50 Detection device
　　51 Camera
　　52 Radar device
　　53 Microphone
　60 Sensor
　　61 Steering angle sensor
　　62 Vehicle speed sensor
　70 Vehicle controller
　　71 Processor
　80 Driving device
　　81 Braking device
　90 Steering device
　110 Output device
　　111 Display
　　112 Speaker
　120 Navigation device
　　121 Position detection device
　　122 Road information
　　123 Map information
　　124 Facility information
300 User terminal apparatus
　310 Processor
　　311 CPU
　　312 ROM
　　313 RAM
　320 Communication device
　330 Input/output device
　　331 Touch panel-type display
　　332 Speaker

The invention claimed is:

1. A communication method for a vehicle dispatch system comprising a communication apparatus configured to control communication between a first apparatus and a second apparatus, the first apparatus and the second apparatus being capable of information exchange with each other,
the communication apparatus including a processor, the processor operating to:
acquire a position of a boarding point for a user inputted by the user to the second apparatus and a current position of a target vehicle to be dispatched to the user;
input electronic commands to one or more cameras mounted on the target vehicle to execute an imaging operation at an identification timing at which a determination is made that the target vehicle enters a range of the predetermined distance from the user's boarding point, and causing the one or more cameras to execute the imaging operation,
generate target vehicle information using a captured image captured by one or more cameras of the target vehicle at current position of the target vehicle at the identification timing; and
transmit the target vehicle information at the identification timing to the second apparatus which is carried by the user and operated by the user for input,
the second apparatus operating to display the received target vehicle information at the identification timing on a display,
wherein the processor operates to generate the target vehicle information including an imaging direction,
wherein the processor operates to:
refer to facility information included in map information to search for a facility existing in a vicinity of the boarding point; and
generate the target vehicle information using the captured image in a direction in which the facility is located with respect to the target vehicle.

2. The communication method according to claim 1, wherein the processor operates to generate the target vehicle information at the identification timing at which the current position of the target vehicle belongs to a predetermined area, wherein the predetermined area is a range to which a passing point at an intersection closest to the boarding point belongs.

3. The communication method according to claim 1, wherein the processor operates to generate the target vehicle information at the identification timing at which a request for the target vehicle information is received from the user.

4. The communication method according to claim 1, wherein the processor operates to generate the target vehicle information including the captured image in a traveling direction of the target vehicle.

5. The communication method according to claim 1, wherein the processor operates to generate the target vehicle information using the captured image captured in a direction in which the boarding point is located with respect to the target vehicle.

6. The communication method according to claim 1, wherein when the target vehicle makes a stop in a vicinity of the boarding point, the processor operates to generate the target vehicle information including the captured image in a right or left direction in which the user boards and/or alights.

7. The communication method according to claim 1, wherein the processor operates to generate the target vehicle information using the captured image including an image of a physical body.

8. The communication method according to claim 1, wherein the processor operates to generate the target vehicle information using the captured image captured in a direction in which the user is located with respect to the target vehicle.

9. The communication method according to claim 1, wherein the processor operates to:
acquire a face image of the user; and
generate the target vehicle information using the captured image including an image having a predetermined degree of coincidence with the face image.

10. The communication method according to claim 1, wherein the processor operates to generate the target vehicle information including an overhead image obtained by combining a plurality of the captured images captured by a plurality of the cameras of the target vehicle.

11. The communication method according to claim 1, wherein the processor operates to generate the target vehicle information including a panoramic image obtained by combining a plurality of the captured images captured by a plurality of the cameras of the target vehicle.

12. The communication method according to claim 1, wherein the processor operates to generate the target vehicle information including an image obtained by projecting a plurality of the captured images captured by a plurality of the cameras of the target vehicle to a three-dimensional coordinate system.

13. A vehicle dispatch system comprising:
a first apparatus capable of information exchange with another apparatus;

a second apparatus carried by a user; and
a communication apparatus configured to control communication between the first apparatus and the second apparatus,
the communication apparatus including a processor, the processor operating to:
  acquire a position of a boarding point for the user inputted by the user to the second apparatus and a current position of a target vehicle to be dispatched to the user;
  input electronic commands to one or more cameras mounted on the target vehicle to execute an imaging operation at an identification timing at which a determination is made that the target vehicle enters a range of the predetermined distance from the user's boarding point, and causing the one or more cameras to execute the imaging operation,
  generate target vehicle information using a captured image captured by one or more cameras of the target vehicle at current position of the target vehicle at the identification timing; and
  transmit the target vehicle information at the identification timing to the second apparatus which is carried by the user and operated by the user for input,
the second apparatus operating to display the received target vehicle information at the identification timing on a display,
wherein the processor operates to generate the target vehicle information including an imaging direction,
wherein the processor operates to:
  refer to facility information included in map information to search for a facility existing in a vicinity of the boarding point; and
  generate the target vehicle information using the captured image in a direction in which the facility is located with respect to the target vehicle.

14. A communication apparatus comprising:
a boarding point acquisition unit configured to acquire a position of a boarding point for a user inputted by the user to a user terminal carried by the user and operated by the user for input;
a vehicle information acquisition unit configured to acquire a current position of a target vehicle to be dispatched to the user;
a target vehicle information generation unit configured to input electronic commands to one or more cameras mounted on the target vehicle to execute an imaging operation at identification timing at which the target vehicle enters a range of the predetermined distance from the user's boarding point, and causing the one or more cameras to execute the imaging operation, generate target vehicle information using a captured image captured by one or more cameras of the target vehicle at current position of the target vehicle at an identification timing at which a determination is made that the target vehicle enters a range of the predetermined distance from the user's boarding point; and
a communication control unit configured to perform control so as to transmit the target vehicle information at the identification timing to the user terminal,
wherein the target vehicle information is generated including an imaging direction,
wherein the target vehicle information generation unit configured to:
  refer to facility information included in map information to search for a facility existing in a vicinity of the boarding point; and
  generate the target vehicle information using the captured image in a direction in which the facility is located with respect to the target vehicle.

* * * * *